US010422852B1

(12) United States Patent
Thiagarajan et al.

(10) Patent No.: US 10,422,852 B1
(45) Date of Patent: Sep. 24, 2019

(54) SYSTEM FOR DETERMINING POSITION OF AN OBJECT

(71) Applicant: AMAZON TECHNOLOGIES, INC., Reno, NV (US)

(72) Inventors: Arvind Thiagarajan, Cambridge, MA (US); David George Butler, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 800 days.

(21) Appl. No.: 14/133,409

(22) Filed: Dec. 18, 2013

(51) Int. Cl.
*G01S 3/02* (2006.01)
*G01S 5/02* (2010.01)

(52) U.S. Cl.
CPC .................... *G01S 5/0294* (2013.01)

(58) Field of Classification Search
CPC .. H04W 64/003; G01S 5/0284; G01S 5/0294; G01S 5/06
USPC ............ 342/451, 463–465; 455/456.2, 456.3
See application file for complete search history.

(56) References Cited

U.S. PATENT DOCUMENTS

| | | | |
|---|---|---|---|
| 7,225,980 B2 | 6/2007 | Ku et al. | |
| 7,446,766 B2 | 11/2008 | Moravec | |
| 7,949,568 B2 | 5/2011 | Fano et al. | |
| 8,009,864 B2 | 8/2011 | Linaker et al. | |
| 8,189,855 B2 | 5/2012 | Opalach et al. | |
| 8,630,924 B2 | 1/2014 | Groenevelt et al. | |
| 9,235,928 B2 | 1/2016 | Medioni et al. | |
| 2009/0119010 A1* | 5/2009 | Moravec | G05D 1/0251 701/533 |
| 2011/0011936 A1 | 1/2011 | Morandi et al. | |
| 2012/0284132 A1 | 11/2012 | Kim et al. | |
| 2013/0284806 A1 | 10/2013 | Margalit | |
| 2015/0019391 A1* | 1/2015 | Kumar | G07G 1/0036 705/28 |

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013], Retrieved from the Internet: <URL:http://citeseerx.ist.psu.edu/viewdoc/summary?doi=10.1.1.127.3033>.

(Continued)

*Primary Examiner* — Dao L Phan
(74) *Attorney, Agent, or Firm* — Lindauer Law, PLLC

(57) ABSTRACT

Described are systems and techniques for determining a position of one or more people within a physical environment, such as an aisle in a fulfillment center. In some instances, the aisle is instrumented with a plurality of radio frequency receivers (RFRXs), active infrared transmitter-receiver pairs (AIRTRPs), and passive infrared (PIR) proximity sensors. A radio frequency-emitting tag carried by the user is detected by the RFRX to determine an identity and approximate position along the length of the aisle. Data indicating obscuration of beams from one or more of the AIRTRPs provides further refinement as to position along the length of the aisle. Data from the PIR provides disambiguation as to which side of the aisle the user is on. Accordingly, the user may be identified and precisely positioned in the aisle.

21 Claims, 11 Drawing Sheets

(56) References Cited

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011, Retrieved from Internet: <URL:http://www.researchgate.net/publication/221568350_How_to_nudge_in_Situ_designing_lambent_devices_to_deliver_salient_information_in_supermarkets>.

Pop, Christian, "Introduction to the BodyCom Technology", AN1391, DS01391A, Microchip Technology, Inc., May 2, 2011.

* cited by examiner

SYSTEM FOR DETERMINING POSITION OF AN OBJECT

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers and the like. Users may move about the respective facilities such as the fulfillment centers, libraries, museums, rental centers, and the like. It is desirable to track the position of the users within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
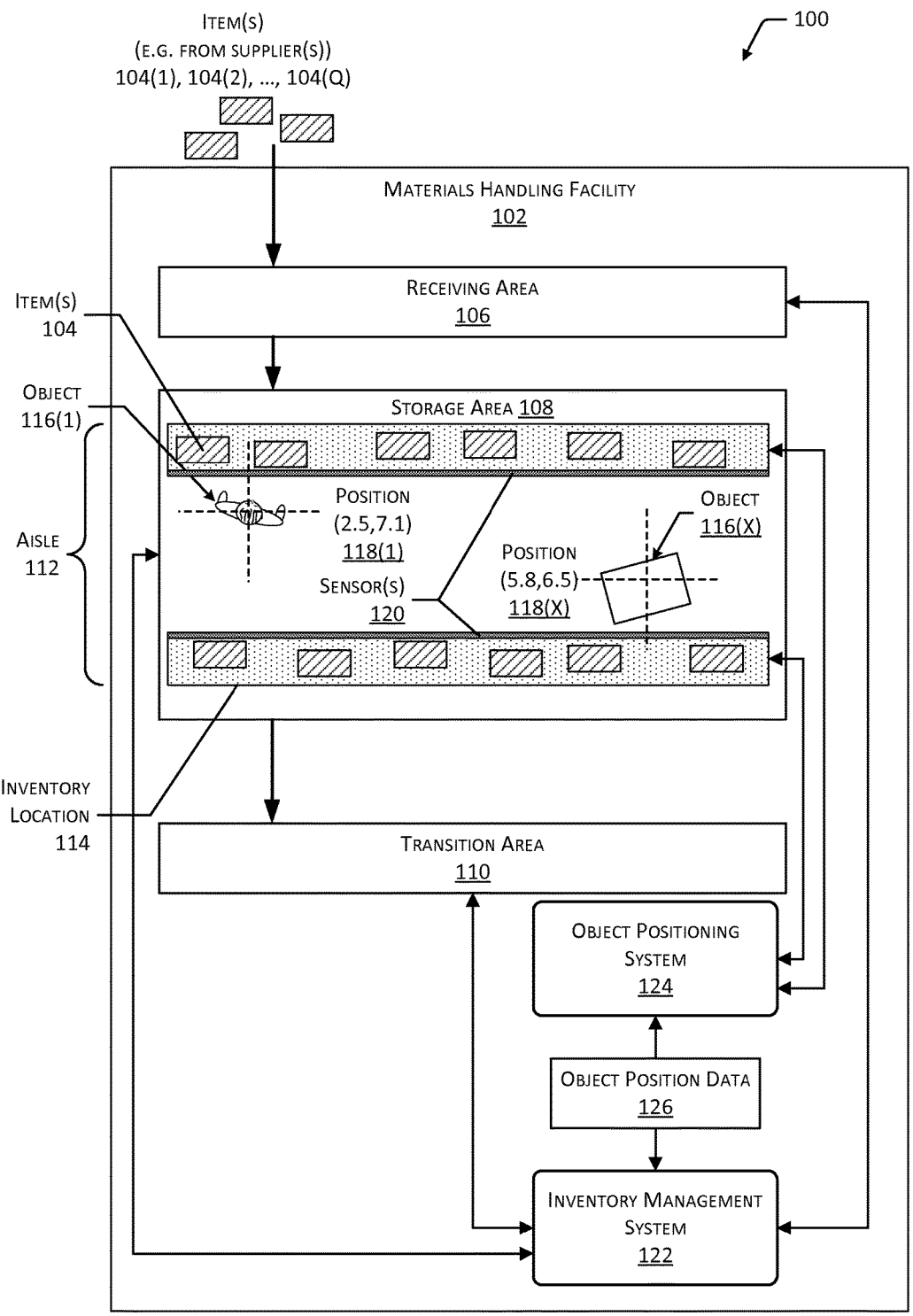
FIG. 1 is a block diagram illustrating a materials handling facility, according to some implementations, within which a position of an object within the facility may be determined.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for determining a position of an object in a facility. The object may comprise a user, a robot, a tote, and so forth. The object may move or be moved from one position to another within the facility. For example, a user may walk through the facility to gather inventory items. Similarly, a robot may move items throughout the facility.

As used in this disclosure, position may be a relative position, or an absolute position with respect to an external reference point. For example, the relative position may comprise an indication of a location within a particular aisle, such as five meters from a first end of the aisle and on the left. In comparison, an absolute position may specify coordinates of a particular latitude and longitude with regard to a geographic datum.

Various services or functionalities within the facility may use the position of the object. For example, an information prompt or indicator may be presented to the user based on the position in the facility. In another example, the position may be used to guide a robot through the facility. In yet another example, the position information may be used to direct the user from one position to another within the facility.

The facility may include one or more aisles, sections, pods, and so forth. For convenience, and not by way of a limitation, this disclosure uses the term "aisles" to denote a portion of the facility. The facility, or portions thereof, may be segregated for positioning purposes into cells. For example, and aisle may be divided into a two dimensional grid which includes rows extending across the aisle from left to right and columns extending from one end of the aisle to the other. In some implementations indications of these cells may be presented to users by way of visual indicia in the form of lines, text, and so forth painted or projected onto the floor. In other implementations, the placement of the cells may be invisible to the users of the facility. The disclosure discusses the cells or positions as a rectilinear grid for ease of illustration and not by way of limitation. In other implementations cells of other shapes may be used. For example, the cells may comprise hexagons arranged in a honeycomb fashion, or other polygons in an area-filling pattern.

Inventory locations may be arranged on one or both sides of the aisles. The inventory locations may include one or more of shelves, racks, cases, cabinets, bins, floor locations, or other suitable storage mechanisms. One or more items comprising physical goods may be stored in the inventory locations. Objects may move along the aisles to access the inventory locations. The objects may include, but are not limited to, people, robots, totes, and so forth. For example, a user or robot may move down the aisle to a particular inventory location to place or retrieve an item. In some implementations the relative position in the facility may be expressed in terms of, or associated with, an inventory location. For example, a relative location may be expressed in terms of "aisle and rack", such as the user is located in aisle five, in front of rack alpha.

The facility may include, or have access to, an inventory management system. The inventory management system may be configured to maintain information about items within the facility. For example, an inventory management system may maintain information indicative of quantities of items at various inventory locations.

The facility includes, or has access to, an object positioning system. The object positioning system is configured to use input from one or more sensors to determine a position of one or more objects within the facility. As described above, the position may be relative or absolute. In addition to position, the object positioning system may be configured to determine and identify the object. For example, the object positioning system may determine a particular user or a particular robot and the position within the facility. In some implementations, the object positioning system may operate in conjunction with the inventory management system. For example, the object positioning system may provide object position data to the inventory management system to track which user is adding or removing inventory from an inventory location. The object position data may include an identity and a position of the object at a specified time or over a time series, providing a track of movement. In some implementations the object position data may include vector information, such as a direction and speed of the object.

The object positioning system determines the object position data using data acquired from one or more sensors. The one or more sensors provide data about objects which may be present within, or proximate to, the aisle. The sensors may include, but are not limited to, radio frequency (RF) receivers, active infrared (IR) transmitter and IR receiver pairs, and passive IR sensors. Other sensors may be used, such as cameras, microbolometers, weight sensors, motion sensors such as accelerometers or gyroscopes, and so forth.

A tag may be associated with the object. The tag may be affixed to, integral with, or carried by, the object. For example, the user may carry a key fob containing the tag. In another example, the tag may be incorporated in a tote. The tag is configured to emit an RF signal. In one implementation, the tag may be a radio frequency identification (RFID) tag configured to emit the RF signal upon activation by an external signal. In another implementation, the tag may comprise a Bluetooth transmitter.

The RF receivers are configured to receive the RF signal emitted by the tag. The RF receivers are configured to provide RF data, which may include an indication of relative signal strength, data transmitted by the signal, and so forth. For example, the RF receivers may provide received signal strength information (RSSI) for the RF signals received. Based at least in part on the RSSI, a distance between the RF receiver and the tag may be determined. Given a known location of the RF receiver with respect to the facility, receiver sensitivity, transmitter output, antenna patterns, and so forth, a set of cells within which the tag may be positioned is determinable. For example, the tag may be determined to be within 1.5 meters of the RF receiver and thus occupies one of the cells within an area described by this distance.

The active infrared (IR) transmitter and IR receiver pairs may be configured to provide a light curtain within the aisle. The light curtain may comprise one or more light beams emitted by the IR transmitter(s) and received by the IR receiver(s). The light curtain may extend horizontally across the aisle from one side to another. In one implementation, the pair of active IR transmitter and IR receiver may be located at about 75 centimeters height relative to the ground, with the IR transmitter on one side of the aisle, and the IR receiver on the opposite side of the aisle. The pair of active IR transmitter and IR receiver may define a row within the aisle. Pairs of the active IR transmitters and corresponding IR receivers may be arranged at intervals along the length of the aisle. As the object moves along the aisle, light beams produced by the IR transmitters are obscured. Data produced by the IR transmitter and IR receiver pairs is also known as active data. The active data provides an indication of which row an object is positioned in and may also provide other information such as a direction of travel, speed, and so forth.

The passive IR sensors may also be arranged along the aisle. For example, passive IR sensors may be arranged at intervals along the length of the aisle and on both sides of the aisle. The passive IR sensors are configured to determine presence of an object based on emission of infrared radiation by, or associated with, the object. The passive IR sensors may be configured with a detection zone extending from an outer edge of the aisle towards a centerline or middle of the aisle. Passive data acquired by the passive IR sensors, provide information indicative of proximity of the object to one or more of the passive IR sensors. Given a known position of the passive IR sensor, determination of presence of the object may be used to determine which side of the aisle the object is positioned on. For example, a passive IR sensor on a left side of the aisle may detect an object, while a corresponding passive IR sensor on the right side of the aisle detects no object. The resulting passive data may be processed to determine that the object is positioned on the left side of the aisle.

Information from the active and passive optical sensors may be combined to form IR observations. In one implementation, the active data provides one or more rows of cells occupied by the object while the passive data provides one or more columns of cells occupied by the object. For example, the object may be determined to be within the cell(s) at the intersection of the determined row(s) and column(s).

The object positioning system is configured to use the data acquired by the non-optical sensors such as the RF receivers, and the optical sensors such as the active IR transmitter and receiver pairs as well as the passive IR sensors. The data is processed using a probabilistic graphical model, Bayesian network, or other technique to generate the object position data. In one implementation, the input to the probabilistic graphical model is a sequence of observations based on the data from the one or more sensors.

The object positioning system is configured to determine probabilities that the object is positioned within a cell. The probabilities may be based on one or more models associated with different aspects of the system. An RSSI model provides a probability distribution of RF signal strength values given the tag being positioned within a particular cell. An optical model provides probability that the object is positioned within a given cell. The optical model may be expressed as a Boolean structure, such as true/false or high/low with regard to a particular cell being occupied by the object. Using the probabilities determined by the RSSI model and the optical model, a first position for the object at a first time "T" may be determined using a Viterbi decoder by identifying the position having a greatest probability. The first position for the object may be used in subsequent steps by the model to determine the position as time increases.

At subsequent times, the model may consider candidate cells for the position at those subsequent times "T+dT". An IR score may be calculated for each of the candidate cells. In one implementation, the IR observations from T+dT may be used to restrict the set of possible positions for the object. For example, an IR beam provided by an IR transmitter, which becomes unblocked at time T+dT implies no object is in the row of cells corresponding to the IR transmitter. As a result, a zero or very low score may be calculated for the cells in the row. Cells with an IR score below a threshold value may be disregarded.

Cells with an IR score above the threshold value comprise a set of candidate cells. Adjacent cells may be determined which are adjacent to the candidate cell. A score for each of the candidate cells is calculated. The score is representative of probabilities associated with movement of the object and the RSSI values obtained by the RF receivers. At a given time, the object positioning system may output as the object position the cell having a highest score.

Furthermore, the tag identifier acquired by the RF receiver from the tag may be used to identify the object. A user, administrator, or automated process may associate the tag identifier with a particular user account. For example, the tag identifier "Z93" may be associated with the user "Alice". For example, a previously unassociated tag identifier may be detected upon entry into the facility. The unassociated tag may then be associated with a corresponding user account based on biometric identification of the user at an entry point.

The facility may include a material handling facility, library, museum, and so forth. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

The systems and techniques described herein allow for determining the position and identity of multiple objects within the aisle or other portions of the facility which are instrumented with the one or more sensors. The combination of the RF and optical sensors used in conjunction with the probabilistic graphical model described herein provides a robust, accurate, and computationally efficient system. In some implementations, the object positioning system may be configured to provide position information which is accurate to within 100 centimeters or less at a $99^{th}$ percentile of accuracy and identity. The resulting object position data may be used by other systems associated with the facility, such as providing information associated with the items stored in the fulfillment center, audit trail information, loss prevention, access control, and so forth.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth. The materials handling facility 102 may include one or more areas designated for different functions with regard to inventory handling. In this illustration, the materials handling facility 102 includes a receiving area 106, a storage area 108, and a transition area 110.

The receiving area 106 may be configured to accept items 104, such as from suppliers, for intake into the materials handling facility 102. For example, the receiving area 106 may include a loading dock at which trucks or other freight conveyances unload the items 104.

The storage area 108 is configured to store the items 104. The storage area 108 may be arranged in various physical configurations, such as a series of aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms. The inventory locations 114 may be affixed to the floor or another portion of the materials handling facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one position within the materials handling facility 102 to another.

One or more objects 116 may move within the materials handling facility 102. The objects 116 may include, but are not limited to, people, robots, totes, and so forth. For example, the object 116 may be a user moving about within the materials handling facility 102 to pick or place the items 104 in various inventory locations 114. In another example, the object 116 may be a tote, which is moved by a person, robot, or other agency within the facility 102.

Each object 116 has a position 118 within the space of the facility 102. The position 118 may be expressed as a relative position or an absolute position. The position 118 may be expressed as a one-dimensional, two-dimensional, or three-dimensional set of coordinates. For example, a compact facility 102 comprising a single aisle 112 may express the position 118 as a one-dimensional value, such as distance down the aisle relative to a reference point. In comparison, a two-dimensional position 118 may express the position 118 as a set of X and Y coordinates relative to a reference point. Similarly, a three-dimensional set of coordinates may express the position 118 as a set of X, Y, and Z coordinates where Z indicates height. In other implementations, instead of or in addition to coordinates the position 118 may be expressed in terms of a particular cell, inventory location 114, and so forth. For example, the location may be specified as "Aisle 7, Row 5, Left Column (side)".

One or more sensors 120 may be configured to acquire information about the objects 116 in the aisle 112. The sensors 120 may include, but are not limited to, radio frequency (RF) receivers, active infrared (IR) transmitter and IR receiver pairs, and passive IR sensors. Other sensors may be used, such as cameras, microbolometers, weight sensors, motion sensors such as accelerometers or gyroscopes, and so forth. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 are depicted functionally rather than schematically. For example, in some implementations multiple different receiving areas 106, storage areas, 108, and transition areas 110 may be interspersed rather than segregated.

The facility 102 may include, or be coupled to, an inventory management system 122. The inventory management system 122 is configured to interact with users or devices such as sensors, robots, material handling equipment, computing devices, and so forth in one or more of the receiving area 106, the storage area 108, or the transition area 110.

The materials handling facility 102 may be configured to receive different kinds of items 104 from various suppliers, and to store them until the customer orders or retrieves one or more of the items 104. A general flow of items 104 through the materials handling facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise commodities perishables, or any suitable type of item, depending on the nature of the enterprise that operates the facility 102.

Upon being received from a supplier at receiving area 106, the items 104 may be prepared for storage. For example, in some implementations, items 104 may be unpacked, or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106 items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having high turnover within a large physical facility, those items 104 may be stored in several different inventory locations 114 to reduce congestion that might occur at a single inventory location 114.

When a customer order specifying one or more items 104 is received, or as a user progresses through the facility 102, the corresponding items 104 may be selected or "picked" from the inventory locations 114 containing those items 104. In various implementations, item picking may range from manual to completely automated picking. For example, in one implementation, a user may have a list of items 104 they desire and may progress through the facility 102 picking items 104 from inventory locations 114 within the storage area 108, and placing those items 104 into a tote. In other implementations, employees of the facility 102 may pick items 104 using written or electronic pick lists derived from customer orders. These picked items 104 may be placed into a tote as the employee progresses through the facility 102.

After items 104 have been picked, they may be processed at a transition area 110. The transition area 110 may be any designated area within the facility 102 where items 104 are transitioned from one location to another, or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The facility 102 includes, or has access to, an object positioning system 124. The object positioning system 124 is configured to use input from the one or more sensors 120 to generate object position data 126. The object position data 126 may include one or more of position information, identity, direction of movement, speed of movement, proximity to other objects 116, and so forth. The position of the object 116 may be stored as a time series, providing a track of movement. As described above, the position 118 may be relative or absolute.

In some implementations, the object positioning system 124 may operate in conjunction with the inventory management system 122 or other systems. For example, the object positioning system 124 may provide the object position data 126 to the inventory management system 122 for use in tracking which user is adding or removing items 104 at a particular inventory location 114. In another example where the object 116 is an employee, the object position data 126 may be used to generate time and attendance data.

The object positioning system 124 may employ a probabilistic graphical model. The model may be used to determine the position 118 based at least in part on probabilities indicative of the object 116, at a particular position. These probabilities may be based on information acquired from non-optical and optical sensors. The sensors 120 and operation of the object positioning system 124 are discussed in more detail below.

Figure 2:
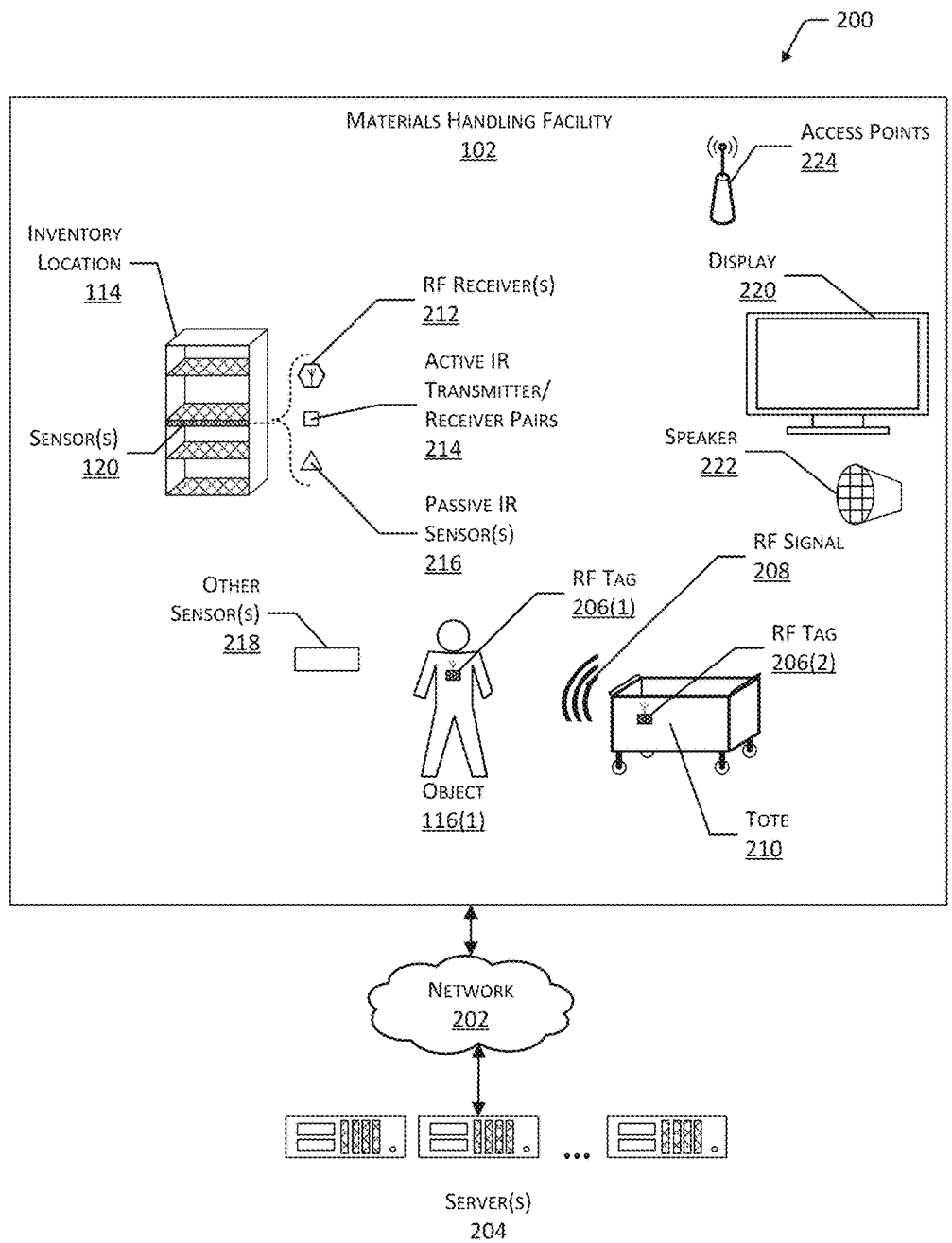
FIG. 2 is a block diagram illustrating additional details of the materials handling facility, according to some implementations.

FIG. 2 is a block diagram 200 illustrating additional details of the materials handling facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., RF, IR, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., RF, cellular, microwave, satellite), or other connection technologies.

The servers 204 may be configured to execute one or more modules or software applications associated with the inventory management system 122, the object positioning system 124, and so forth. While the servers 204 are illustrated as being in a location outside of the facility 102, in other implementations at least a portion of the servers 204 may be located at the facility 102. The servers 204 are discussed in more detail below with regard to FIG. 3.

As described above the facility 102 may have one or more objects 116 which move throughout the facility 102. One or more RF tags 206 may be associated with the object 116. The RF tags 206 are configured to emit an RF signal 208. In one implementation, the RF tag 206 may be a radio frequency identification (RFID) tag configured to emit the RF signal 208 upon activation by an external signal. For example, the external signal may comprise a radio frequency signal or a magnetic field configured to energize or activate the RFID tag. In another implementation, the RF tag 206 may comprise a transmitter and a power source configured to power the transmitter. For example, the RF tag 206 may comprise a Bluetooth Low Energy (BLE) transmitter and battery. In other implementations, the tag may use other techniques to indicate presence. For example, an acoustic tag may be configured to generate an ultrasonic signal.

The objects 116 which may move about the facility 102 may include a tote 210. The tote 210 is configured to carry or otherwise transport one or more items 104. For example, the tote 210 may include a basket, a cart, a bag, and so forth. In some implementations, the tote may include an RF tag 206.

Generally, the inventory management system 122, the object positioning system 124, or other systems associated with the facility 102 may include any number and combination of input components, output components, and servers 204.

The one or more sensors 120 may be associated with the inventory locations 114. The sensors 120 may include one or more RF receivers 212 configured to detect the RF signal 208 emitted by the RF tag 206. The RF receivers 212 may be configured to report received signal strength information (RSSI) data associated with the received RF signal 208. The RF receivers 212 may also be configured to receive other information. For example, the RF receivers 212 may be configured to receive data transmitted by the RF tag 206, such as a tag identifier. As described below, the tag identifier may be associated with an identity of the object 116. For example, the tag identifier "Z93" may be associated with the user account for the person "Alice".

The RF receivers 212 exhibit a receive range or distance which is based at least in part on the antenna, receiver sensitivity, local RF noise, and so forth. In some implementations, the RF receivers 212 may be configured to exhibit a typical receive range or distance of about 1.5 meters to 2 meters with respect to the RF signal 208. The RF receivers 212 are arranged within the facility 102 at known positions. This arrangement is discussed in more detail below with regard to FIG. 5.

An RF transmitter may be combined with the RF receivers 212. For example, the RF receivers 212 may be part Bluetooth LE nodes. In some implementations these RF transmitters and the RF receivers 212 may be used to provide network connectivity. For example, the Bluetooth LE nodes may act as network access points.

The sensors 120 may also include active IR transmitter/receiver pairs (pairs) 214. These pairs 214 are configured to emit a light beam from the IR transmitter, which is directed towards a corresponding receiver. When in the path of the light beam, the object 116 may obscure the light beam decreasing the intensity of the received beam at the receiver. The pairs 214 are arranged within the facility 102 at known positions.

In some implementations, an active IR transmitter/receiver pair 214 may be associated with each row in the aisle 112. A plurality of the pairs 214 may be arranged along the aisle 112, forming a "light curtain". This arrangement is discussed in more detail below with regard to FIG. 5. Output from the receiver may be used to determine the presence of the object 116 in the row. While the active IR transmitter and receiver are described in pairs, in other implementations, other configurations may be used. For example, a single IR transmitter may provide light beams to a plurality of IR receivers.

In some implementations, the light emitted by the IR transmitter may be modulated. For example, different IR transmitters may use different pulse width modulation frequencies.

The sensors 120 may include passive IR sensors 216. The passive IR sensors 216 are configured to determine proximity of an object 116 by detecting infrared radiation emitted by the object 116. In some implementations the passive IR sensors 216 may be referred to as "passive IR sensors" or "passive IR proximity sensors". The passive IR sensors 216 may comprise pyroelectric materials configured to generate an electrical signal or change one or more electrical characteristics (such as resistance) based on the IR radiation incident thereon. The passive IR sensor 216 may be configured to generate a signal when the level of the IR detected changes beyond a threshold amount, or exhibits a particular gradient of change. The passive IR sensor 216 may exhibit a window or area of coverage within which the object 116 may be detected. The passive IR sensors are arranged within the facility 102 at known positions. In some implementations, a passive IR sensor 216 may be placed on one or both sides of the aisle 112 for each row. This arrangement is discussed in more detail below with regard to FIG. 5. The resulting data provided by passive IR sensor 216 may thus indicate which side of the aisle 112, or column, the object 116 is present at.

In some implementations, other proximity sensors may be used instead of, or in addition to the passive IR sensors 216. For example capacitive proximity sensors may determine presence of the object 116.

Other sensors 218 may also be used in the facility 102 and may provide data to one or more of the inventory management system 122, the object positioning system 124, or other systems. These other sensors 218 may include cameras, imaging devices, microbolometers, weight sensors, pressure sensors, Interpolating Force-Sensitive Resistance (IFSR) sensors, motion sensors, microphones, touch sensors, radio receivers, and so forth. The motion sensors may include accelerometers, gyroscopes, tilt sensors, gravimeters, and so forth. The other sensors 218 may include other components capable of receiving input about the environment.

The facility 102 may also include output devices. These output devices are configured to present information to users or otherwise provide output to the surrounding environment. The facility 102 may include one or more display devices 220. The display devices 220 may include electronically addressable displays configurable to present a visual image. For example, the display devices 220 may include projectors, liquid crystal displays, cathode ray tubes, plasma displays, and so forth. One or more speakers 222 may also be available to present audible output. Other output devices (not depicted) may also be present, such as printers, haptic output devices, and so forth.

The facility 102 may include one or more access points 224 configured to establish one or more wireless networks. The access points 224 may use Wi-Fi, near field communication (NFC), Bluetooth, or other technologies to establish wireless communications between a device and the network 202. The wireless networks allow the devices to communicate with one or more of the inventory management system 122, the object positioning system 124, the sensors 120, other sensors 218, the RF tag 206, a communication device of the tote 210, or other devices.

Figure 3:
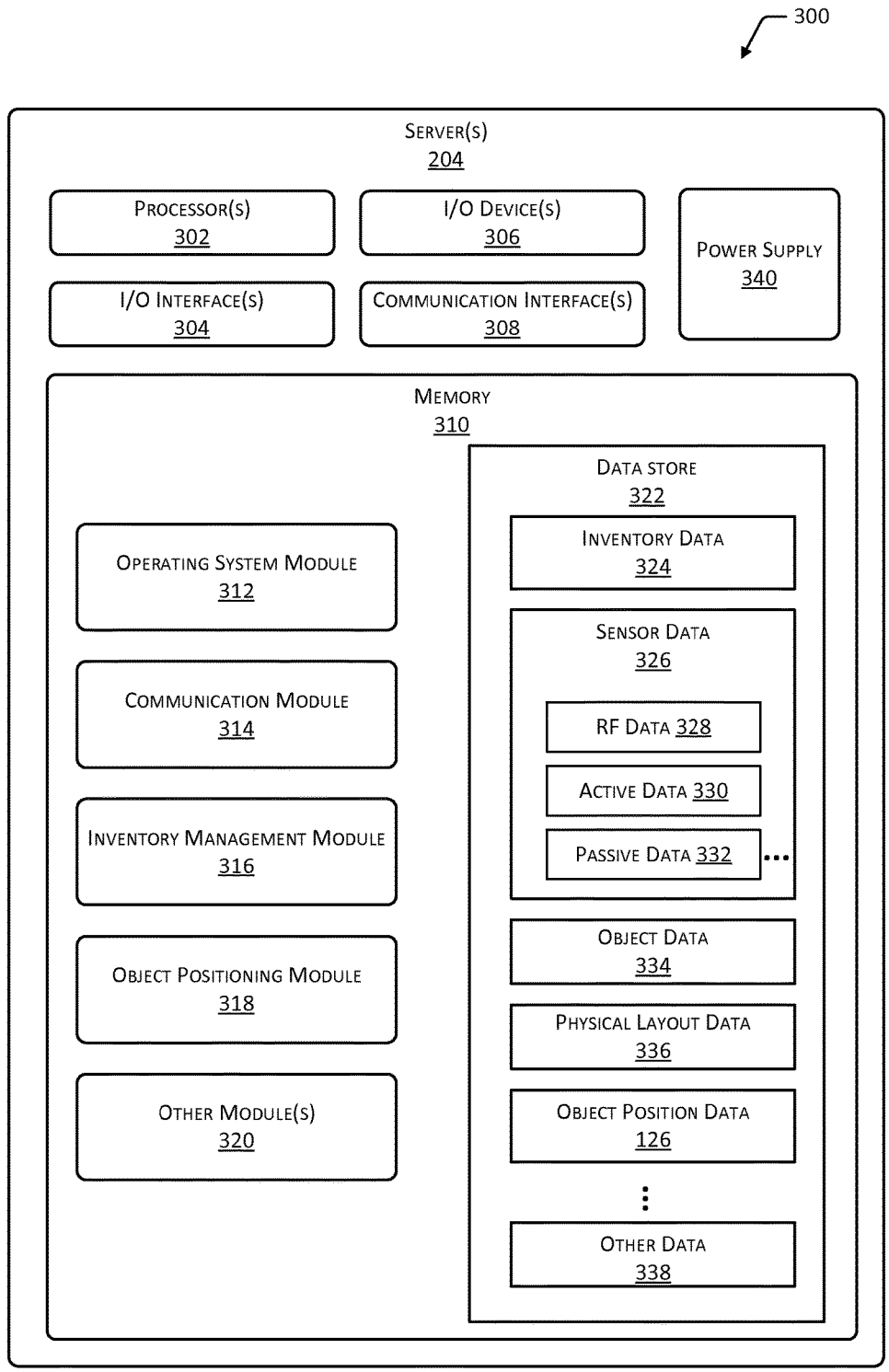
FIG. 3 illustrates a block diagram of a server configured to determine the position of the object within the facility, according to some implementations.

FIG. 3 illustrates a block diagram 300 of the server 204. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers" and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interfaces 304 may comprise inter-integrated circuit (I2C), serial peripheral interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as one or more of a keyboard, mouse, scanner, and so forth. The I/O devices 306 may also include output devices such as one or more of a display, printer, audio speakers, and so forth. In some embodiments, the I/O devices 306 may be physically incorporated with the server 204 or may be externally placed.

The server 204 may also include one or more communication interfaces 308. The communication interfaces 308 are configured to provide communications between the server 204 and other devices, such as the sensors 120, routers, the access points 224, and so forth. The communication interfaces 308 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi, and so forth.

The server 204 may also include one or more busses or other internal communications hardware or software that allow for the transfer of data between the various modules and components of the server 204.

As shown in FIG. 3, the server 204 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. The memory 310 provides storage of computer readable instructions, data structures, program modules and other data for the operation of the server 204. A few example functional modules are shown stored in the memory 310, although the same functionality may alternatively be implemented in hardware, firmware, or as a system on a chip (SOC).

The memory 310 may include at least one Operating System (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variation of the Linux operating system as promulgated by Linus Torvalds, the Windows Server operating system from Microsoft Corporation of Redmond, Wash., and so forth.

Also stored in the memory 310 may be one or more of the following modules. These modules may be executed as foreground applications, background tasks, daemons, and so forth.

A communication module 314 may be configured to establish communications with one or more of the sensors 120, other servers 204, or other devices. The communications may be authenticated, encrypted, and so forth.

The memory 310 may store an inventory management module 316. The inventory management module 316 is configured to provide the inventory functions as described herein with regard to the inventory management system 122. For example, the inventory management module 316 may track items 104 between different inventory locations 114.

The memory 310 may also store an object positioning module 318 configured to provide the object position data 126 as described herein with regard to the object positioning system 124. The object positioning module 318 is configured to access sensor data received from the one or more sensors 120 and generate the object position data 126. In some implementations, the object positioning module 318 may use a probabilistic graphical model to determine the position of the object 116. Operation of the object positioning module 318 and the techniques used to generate the object position data 126 are discussed below in more detail.

Other modules 320 may also be present in the memory 310. For example, a time and attendance module may be configured to access the object position data to determine a quantity of hours in which an employee was within the facility 102. In another example, a user authentication module may be configured to authenticate or identify a user. For example, the user authentication module may use biometric data such as a fingerprint, iris scan, venous pattern, and so forth to identify the user.

The memory 310 may also include a data store 322 to store information. The data store 322 may use a flat file, database, linked list, tree, executable code, script, or other data structure to store the information. In some implementations, the data store 322 or a portion of the data store 322 may be distributed across one or more other devices including other servers 204, network attached storage devices, and so forth.

The data store 322 may include inventory data 324. The inventory data 324 may comprise information associated with the items 104. The information may include one or more inventory locations 114, at which one or more of the items 104 are stored. The inventory data 324 may also include price, quantity on hand, weight, price, expiration date, and so forth. The inventory management module 316 may store information associated with inventory management functions in the inventory data 324.

The data store 322 may also store sensor data 326. The sensor data 326 may include one or more of RF data 328, active data 330, or passive data 332. The object positioning module 318 may access the sensor data 326.

The RF data 328 may comprise information generated by the RF receivers 212. For example, the RF data 328 may include information indicative of a particular RF receiver 212, a tag identifier received from the RF tag 206, a received signal strength indication indicative of the signal strength associated with the RF signal 208 at a particular RF receiver 212, and so forth. In some implementations the RF data 328 may include information acquired by one or more of the access points 224.

The active data 330 may include information generated by active IR transmitter/receiver pairs 214. The information may indicate whether light from a particular active IR transmitter is obscured or unobscured with respect to the corresponding IR receiver in the pair. For example, the active data 330 may include information indicative of a particular IR transmitter/receiver pair 214, a duration of the obscuration, and so forth.

The passive data 332 may include information generated by passive IR sensors 216. The information may indicate whether an object has been detected proximate to the passive IR sensor 216. For example, the passive data 332 may include information indicative of a particular passive IR sensor 216, size of the object, intensity of the infrared signal received from the object, and so forth.

In some implementations the placement of the tags and the receivers may be switched from that described above. For example, the object 116 may carry a receiver while the transmitters are arranged within the facility 102. Continuing the example, the user may carry an acoustic receiver while acoustic transmitters are in fixed positions along with the sensors 120.

Object data 334 may also be stored in the data store 322. The object data 334 comprises information associated with the object 116. The information may include type of object, RF tag identifier, object size data, identification characteristics, and so forth. For example, the object data 334 may indicate that the object 116(1) is a user, is associated with the RF tag identifier of "Z93", that the user is approximately 2 m tall, 60 cm wide, and 18 cm thick. Continuing the example, the object data 334 may also associate the object with a particular user account, device account, and so forth. The object positioning system 124 may access the object data 334 as part of the process to generate the object position data 126. For example, the object positioning module 318 may retrieve the user account associated with a particular RF tag identifier.

Physical layout data 336 may also be stored in the data store 322. The physical layout data 336 provides a mapping between different devices, such as the sensors 120, and physical positions within the facility 102. For example, the physical layout data 336 may indicate the coordinates within the facility 102 for each of the RF receivers 212, the active IR transmitter/receiver pairs 214, and the passive IR sensors 216. The physical layout data 336 may also include the positions of the inventory locations 114, the aisles 112, or other features of the facility 102. In some implementations, the physical layout data 336 may also include information designating boundaries of one or more cells used to indicate positions 118 within the facility 102. For example, boundaries of, or a center of, a particular cell at a particular row and column of a given aisle 112 may be specified. The object positioning system 124 may access the physical layout data 336 as part of the process to generate the object position data 126.

The memory 310 may also store the object position data 126. The object position data 126 may include one or more of position information, identity, direction of movement, speed of movement, proximity to other objects 116, and so forth. The position of the object 116 may be stored as a time series, providing a track of movement.

The data store 322 may store other data 338 as well, such as user preferences, configuration files, permissions associated with user accounts, time and attendance data, and so forth.

The server 204 may also include a power supply 340. The power supply 340 is configured to provide electrical power suitable for operating the components in the server 204.

Figure 4:
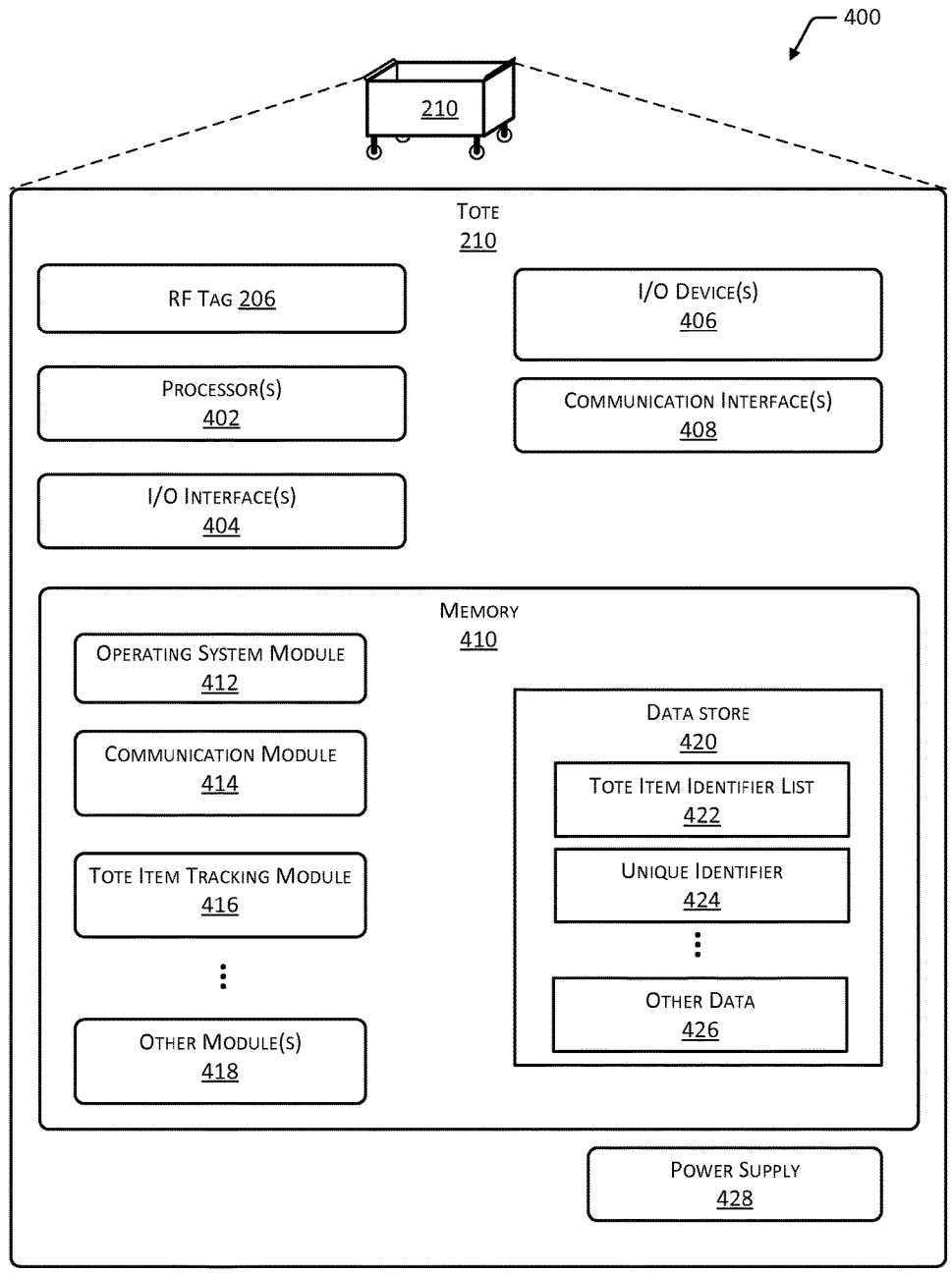
FIG. 4 is a block diagram of a tote, according to some implementations.

FIG. 4 illustrates a block diagram 400 of the tote 210, according to some implementations. The tote 210 may include an RF tag 206. The RF tag 206 may be affixed to, integral with, or is otherwise associated with the tote 210. In some implementations, the tote 210 may have identifiers, tags, or other indicia thereupon. For example, a machine-readable optical code, such as a barcode, may be affixed to a side of the tote 210.

The tote 210 may include one or more hardware processors 402 (processors) configured to execute one or more stored instructions. The processors 402 may comprise one or more cores. The tote 210 may include one or more I/O interface(s) 404 to allow the processor 402 or other portions of the tote 210 to communicate with other devices. The I/O interfaces 404 may include I2C, SPI, USB, RS-232, and so forth.

The I/O interface(s) 404 may couple to one or more I/O devices 406. The I/O devices 406 may include input devices such as one or more of a camera, a microphone, a touch sensor, a button, range camera, accelerometer, gyroscope, magnetometer, tilt sensor, weight sensor, pressure sensor, proximity sensor, and so forth. Other input devices may include RFID readers, NFC readers, barcode scanners, fingerprint readers, and so forth. The I/O devices 406 may also include output devices such as one or more of a display, audio speakers, haptic output device and so forth. In some implementations input and output devices may be combined. For example, a touchscreen display may incorporate a touch sensor and a display 220. In some embodiments, the I/O devices 406 may be physically incorporated with the tote 210 or may be externally placed.

The tote 210 may also include one or more communication interfaces 408. The communication interfaces 408 are configured to provide communications between the tote 210 and other devices, such as other totes 210, routers, access points 224, the servers 204, and so forth. The communication interfaces 408 may include devices configured to couple to PANs, LANs, WANs, and so forth. For example, the communication interfaces 408 may include devices compatible with Ethernet, Wi-Fi, Bluetooth, ZigBee, and so forth.

The tote 210 may also include one or more busses or other internal communications hardware or software that allow for the transfer of data between the various modules and components of the tote 210.

As shown in FIG. 4, the tote 210 includes one or more memories 410. The memory 410 comprises one or more CRSM as described above. The memory 410 provides storage of computer readable instructions, data structures, program modules and other data for the operation of the tote 210. A few example functional modules are shown stored in the memory 410, although the same functionality may alternatively be implemented in hardware, firmware, or as a SOC.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 412 may implement a variation of the Linux operating system, such as Android as promulgated by Google, Inc. Other OS modules 412 may be used, such as the Windows operating system from Microsoft Corporation of Redmond, Wash., the LynxOS from Lynux-Works of San Jose, Calif., and so forth.

Also stored in the memory 410 may be one or more of the following modules. These modules may be executed as foreground applications, background tasks, daemons, and so forth.

A communication module 414 may be configured to establish communications with one or more of the sensors 120, servers 204, or other devices. The communications may be authenticated, encrypted, and so forth.

The memory 410 may also store a tote item tracking module 416. The tote item tracking module 416 is configured to maintain a list of items 104, which are associated with the tote 210. For example, the tote item tracking module 416 may receive input from a user by way of a touch screen display with which the user may enter information indicative of the item 104 placed in the tote 210. In another example, the tote item tracking module 416 may receive input from one of the I/O devices 406, such as an RFID or NFC reader. The tote item tracking module 416 may send the list of items 104 to the inventory management system 122. The tote item tracking module 416 may also be configured to receive information from the inventory management system 122. For example, a list of items 104 to be picked may be presented within a user interface on the display 220 of the tote 210.

Other modules 418 may also be stored within the memory 410. In one implementation, a user authentication module may be configured to receive input and authenticate or identify a particular user. For example, the user may enter a personal identification number or may provide a fingerprint to the fingerprint reader to establish their identity.

The memory 410 may also include a data store 420 to store information. The data store 420 may use a flat file, database, linked list, tree, executable code, script, or other data structure to store the information. In some implementations, the data store 420 or a portion of the data store 420 may be distributed across one or more other devices including the servers 204, other totes 210, network attached storage devices and so forth.

The data store 420 may store a tote item identifier list 422. The tote item identifier list may comprise data indicating one or more items 104 associated with the tote 210. For example, the list may indicate the items 104, which are present in the tote 210. The tote item tracking module 416 may generate or otherwise maintain a tote item identifier list 422.

A unique identifier 424 may also be stored in the memory 410. In some implementations, the unique identifier 424 may be stored in rewritable memory, write-once-read-only memory, and so forth. For example, the unique identifier 424 may be burned into a one-time programmable non-volatile memory, such as a programmable read-only memory (PROM). In some implementations, the unique identifier 424 may be part of a communication interface 408. For example, the unique identifier 424 may comprise a media access control address associated with a Bluetooth interface.

Other data 426 may also be stored within the data store 420. For example, tote configuration settings, user interface preferences, and so forth may also be stored.

The tote 210 may also include a power supply 428. The power supply 428 is configured to provide electrical power suitable for operating the components in the tote 210. The power supply 428 may comprise one or more of photovoltaic cells, batteries, wireless power receivers, fuel cells, capacitors, and so forth.

Figure 5:
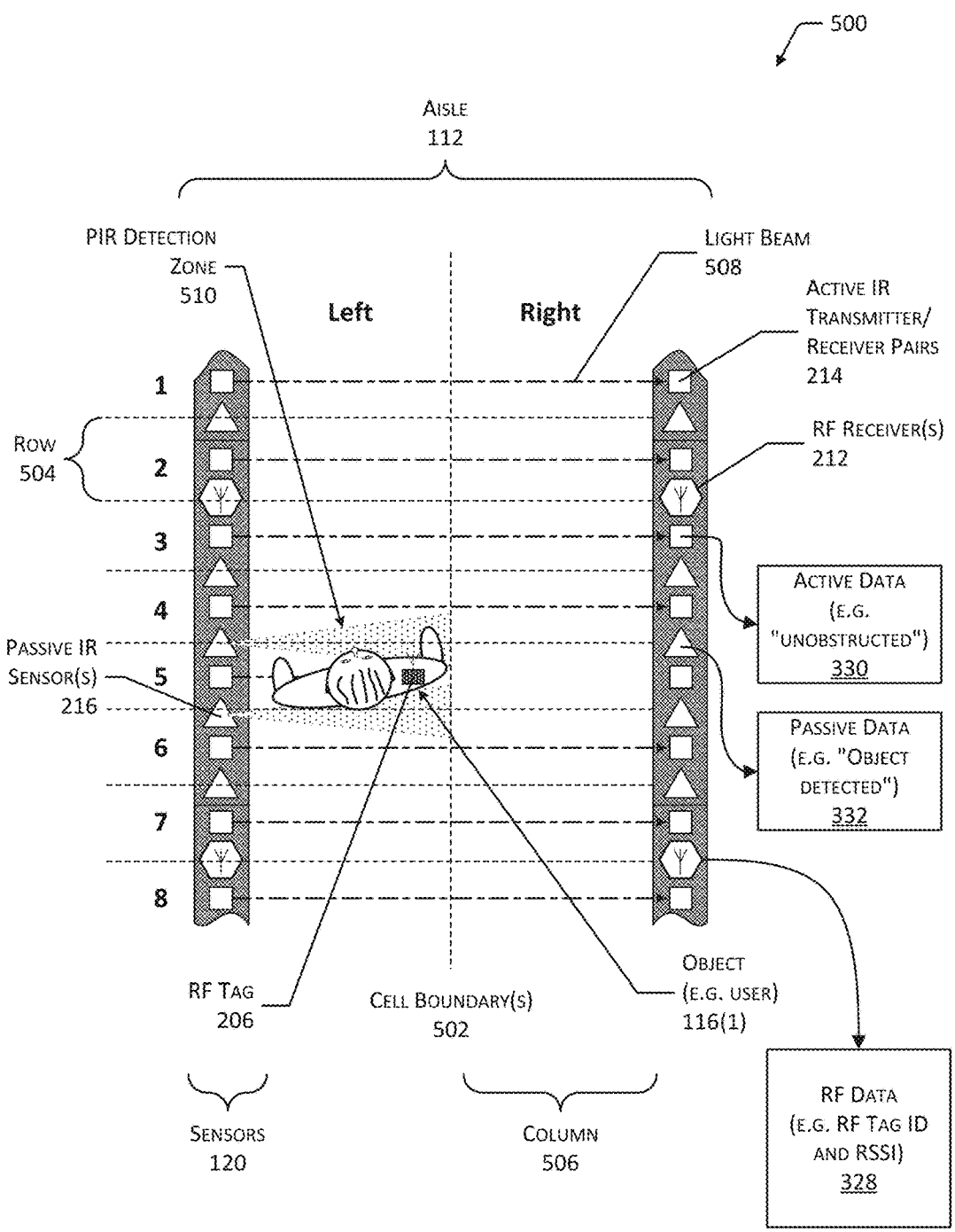
FIG. 5 illustrates a portion of an aisle within the materials handling facility configured with sensors to gather data for position determination, according to some implementations.

FIG. 5 illustrates a plan view 500 looking down on an aisle 112 within the facility 102. In this illustration, sensors 120 are arranged on both sides of the aisle 112, such as to the left and to the right of the aisle 112. As used in this disclosure, "left" and "right" with respect to positions in the aisle 112 are used for convenience and not as a limitation. The aisle 112 may be divided into a two-dimensional grid. In this illustration, cell boundaries 502 are indicated with a dotted line. The two-dimensional grid includes rows 504 and columns 506. For ease of illustration, the rows 504 are designated by numbers while the columns 506 are designated as "Left" or "Right". While two columns 506 are illustrated, in some implementations the aisle 112 may be divided into a single column or more than 2 columns.

As described above, a plurality of RF receivers 212 are configured to receive the RF signal emitted by the RF tag 206. The RF receivers 212 are configured to provide RF data 328, which may include an indication of relative signal strength, data transmitted by the RF signal 208 such as an RF tag identifier, and so forth. For example, the RF receivers 212 may provide received signal strength information (RSSI) for the RF signals 208 received. The RSSI may comprise a relative or dimensionless indication of signal strength, or may provide information expressed in dimensional terms, such as decibels referenced to one milliwatt (dBm). The RSSI may, but need not be, a value provided by a particular protocol, such as the received signal strength indicator as provided for in the Wi-Fi protocol. In some implementations other indications of received signal strength such as received channel power indicator (RCPI) as supported by Wi-Fi may be used. The RF receivers 212 may be arranged at known locations within the aisle 212. For example, as illustrated here several RF receivers 212 are arranged at horizontal intervals along each side of the aisle 112. For example, the RF receivers 212 (or the antennas thereof) located along a side of the aisle 112 may be placed at intervals of between 60 and 200 centimeters as measured horizontally between the devices.

The active infrared (IR) transmitter/receiver pairs (pairs) 214 may be configured to provide a light curtain within the aisle 112. The light curtain may comprise a plurality of light beams 508 provided by the pairs 214. The light curtain may extend horizontally across the aisle 112 from one side to another. The term light beam 508 is used by way of illustration, and not as a limitation. In some implementations, the IR transmitter may provide a non-focused emission of infrared light.

The pair 214 may be located above ground level, with the transmitter on one side of the aisle 112, and the receiver on the opposite side of the aisle 112. For example, the height of the pair 214 may be between 60 and 100 cm above the floor of the aisle 112. The pair 214 may define the row 504 within the aisle. For example, each row 504 may have a single light beam 508.

Horizontal spacing between the pairs 214 may be selected based on requirements to attain a particular level of accuracy. For example, shorter horizontal spacing may result in smaller cell sizes compared to larger spacing. For example, the horizontal spacing between the pairs 214 may be between 8 and 30 cm.

In this illustration, the light beam 508 is arranged approximately at a midpoint of the row 504, relative to the cell boundaries 502. Continuing the example above with regard to the horizontal spacing, each row 504 in this illustration may be about 15 centimeters as measured along a shortest dimension of the rectangle. In other implementations, the light beams 508 may define at least a portion of the cell boundary 502.

As an object 116 moves along the aisle 112, light beams 508 produced by the IR transmitters are obscured, or otherwise blocked or attenuated by the object 116. For example, as illustrated here the object 116(1) comprising a user is positioned with a center of mass at row 5 in the left column. The light beam 508 emitted by the IR transmitter within a row 5 is blocked by the body of the user, resulting in a drop in the detected intensity of the infrared light at the receiver on the opposite side of the aisle 112.

The corresponding IR receivers generate active data 330 characterizing the infrared light falling on the receivers. The active data 330 may indicate the presence or absence of the light beam 508, intensity of the received light, and so forth. The active data 330 provides an indication of which row 504 an object 116 is positioned within. Other information may be derived from the active data 330, such as a direction of travel, speed, and so forth. However, because the light beam 508 spans the aisle 112, the column 506 which the object 116 occupies is unknown.

The passive IR sensors 216 may also be arranged along the aisle 112. For example, passive IR sensors 216 may be arranged at horizontal intervals along a length of the aisle 112, on both sides of the aisle 112. In some implementations, the passive IR sensors 216 may be arranged on one side of the aisle 112, or may alternate from one side of the aisle 112 to the other.

The passive IR sensors 216 are configured to determine presence of an object 116 based on emission of infrared radiation by the object 116, an occlusion of background infrared radiation by the object 116, and so forth. In this illustration, the passive IR sensors 216 are arranged such that they provide a passive infrared detection zone 510 (zone) within a row 504. In some implementations, such as depicted here, each row may have a passive IR sensor 216 on each side of the aisle 112. However, in other implementations, the passive IR sensors 216 may be spaced horizontally along the length of the aisle 112, such that the passive IR sensor 216 is present at every $n^{th}$ row. For example, the passive IR sensor 216 may be located at every third row 504.

The zone 510 is depicted as having a boundary within the row 504 and extended to approximately the midline of the aisle 112, corresponding to the boundaries of the respective cells. In other implementations, the zone 510 may extend into adjacent rows, columns, or both. Thus a single passive IR sensor 216 may maintain a zone 510, which covers 2 or more rows 504.

The passive data 332 acquired by the passive IR sensors 216, provides information indicative of proximity of the object 116 to one or more of the passive IR sensors 216. Given a known position of the passive IR sensor 216, determination of presence of the object 116 may be used to determine which side or column 506 of the aisle 112 the object 116 is positioned on. For example, as depicted here the user 116(1) is detected by the passive IR sensors 216 located on the left side of the aisle 112 at the boundaries of the rows 4 and 5. The resulting passive data 332 indicates the object 116 is in the left column 506. However, because the zone 510 extends across more than one cell, the row 504, which the object 116 occupies, is unknown.

The spacing between the individual sensors 120 may be varied based on one or more factors. For example, a closer spacing may be used when a finer degree of position 118 determination is called for. Contrariwise, in situations where coarser position 118 is acceptable, spacing between the sensors 120 may be increased. Furthermore, the spacing between individual sensors 120 may vary from aisle 112 to aisle 112, or within an aisle 112. For example, a first portion of the aisle 112 may have the sensors 120 positioned at a first distance relative to one another while a second portion farther down the aisle 112 may have the sensors 120 positioned at a second distance relative to one another, wherein the second distance is greater than the first.

In other implementations other types of sensors may be used. For example, a microbolometer may be used to generate an infrared image of at least a portion of the aisle 112. Data based on this infrared image may be used in place of, or in addition to, the active data 330, the passive data 332, or both.

As described above, the positions of the sensors 120 in the facility 102 may be stored in the physical layout data 336. For example, the physical layout data 336 may indicate that the passive IR sensor 216(597) maintains a zone 510, which encompasses row 4 and row 5 of the left column 506 in aisle 112(43). The object positioning module 318 may use the physical layout data 336 to generate the object position data 126.

Figure 6:
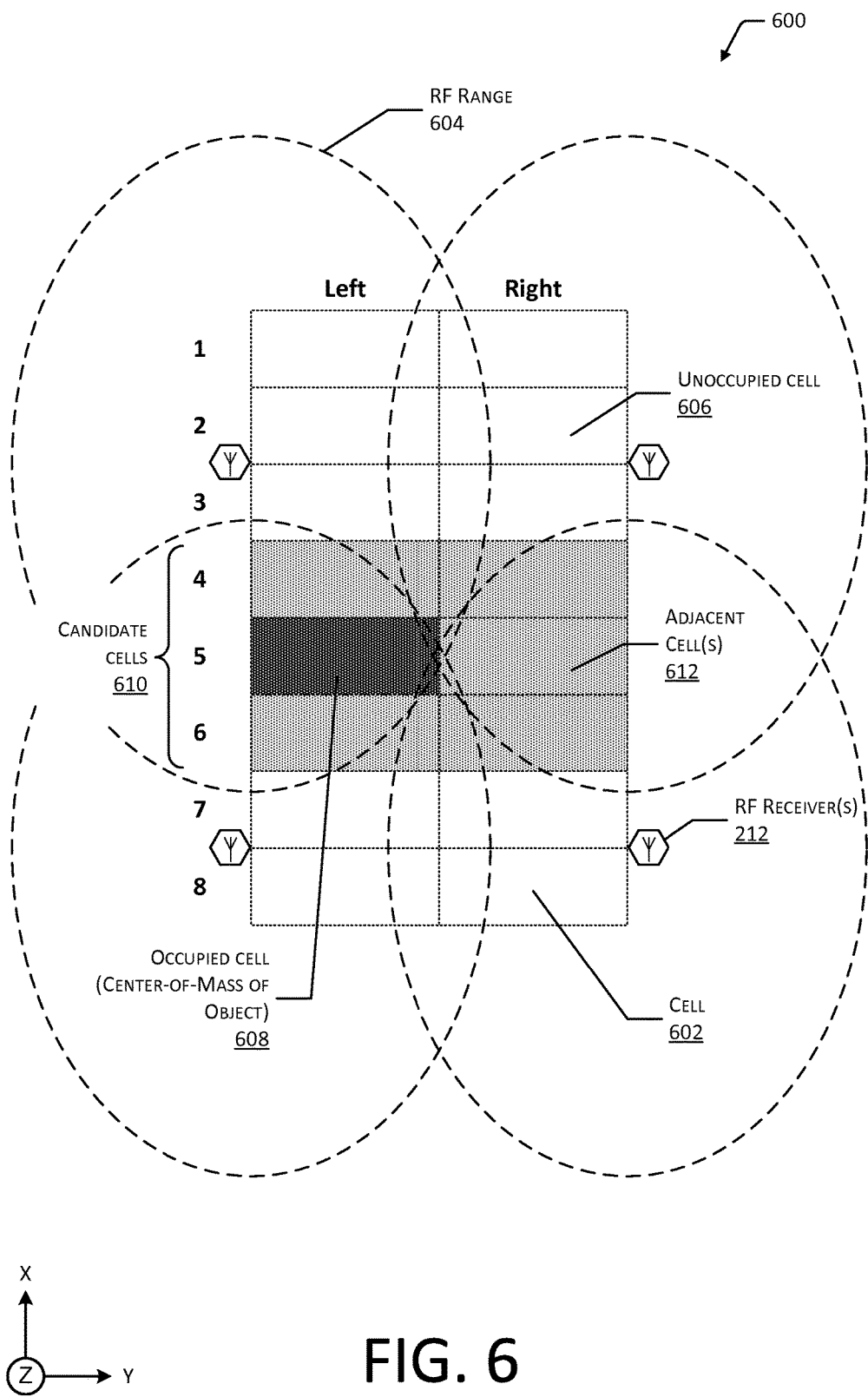
FIG. 6 illustrates a plan view of a portion of the aisle of FIG. 5 depicting position cells designated within the aisle, according to some implementations.

FIG. 6 illustrates a plan view 600 looking down on the portion of the aisle 112 of FIG. 5, according to some implementations. In this illustration, the rows 504 and columns 506 of the grid are depicted. The grid comprises a plurality of cells 602. In some implementations, a non-rectilinear arrangement of cells 602 may be used. For example, cells 602 may comprise hexagons.

Superimposed on the cells 602 are RF ranges 604 associated with the RF receivers 212. The RF ranges 604 are depicted as broken lines and indicate a distance at which an RF signal 208 of a given radiated power will produce a given signal strength at the RF receiver 212. The RF ranges 604 are depicted in this illustration as ellipses, however, other patterns may result from different antenna design, signal phasing, physical placement, interference from RF noise sources, and so forth. Furthermore, while the RF ranges 604 are depicted to overlap and provide contiguous coverage for the portion of the aisle 112 depicted, in some implementations, there may be more or less overlap between 2 or more RF ranges 604.

The object positioning module 318 may designate some of the cells as unoccupied cells 606. For example, based on the active data 330 and the passive data 332 some cells may be determined to be unoccupied. This determination is discussed in more detail.

An occupied cell 608 is the cell in which the object 116 is positioned. In some implementations where the object 116 extends beyond the confines of a single cell 602, the occupied cell 608 may indicate a center-of-mass (CoM) associated with the object 116. As used in this disclosure, "center-of-mass" may indicate an arbitrary center of the object 116, and not necessarily a physical or geometric balance point for the object 116. As described in more detail below, the object positioning module 318 may determine a set of candidate cells 610. These candidate cells 610 may include one or more adjacent cells 612, which are proximate to, or about the occupied cell 608. The adjacent cells 612 may include those cells which share at least one edge or vertex with the occupied cell 608. The candidate cells 610 may include cells to which the object 116 may move to, or remain within, given a particular time interval. For example, the adjacent cells 612 may be based at least in part on assumptions as to a maximum speed the object 116 may travel within the facility 102 (such as 5 kilometers-per-hour) and a time interval (such as 200 milliseconds).

Figure 7:
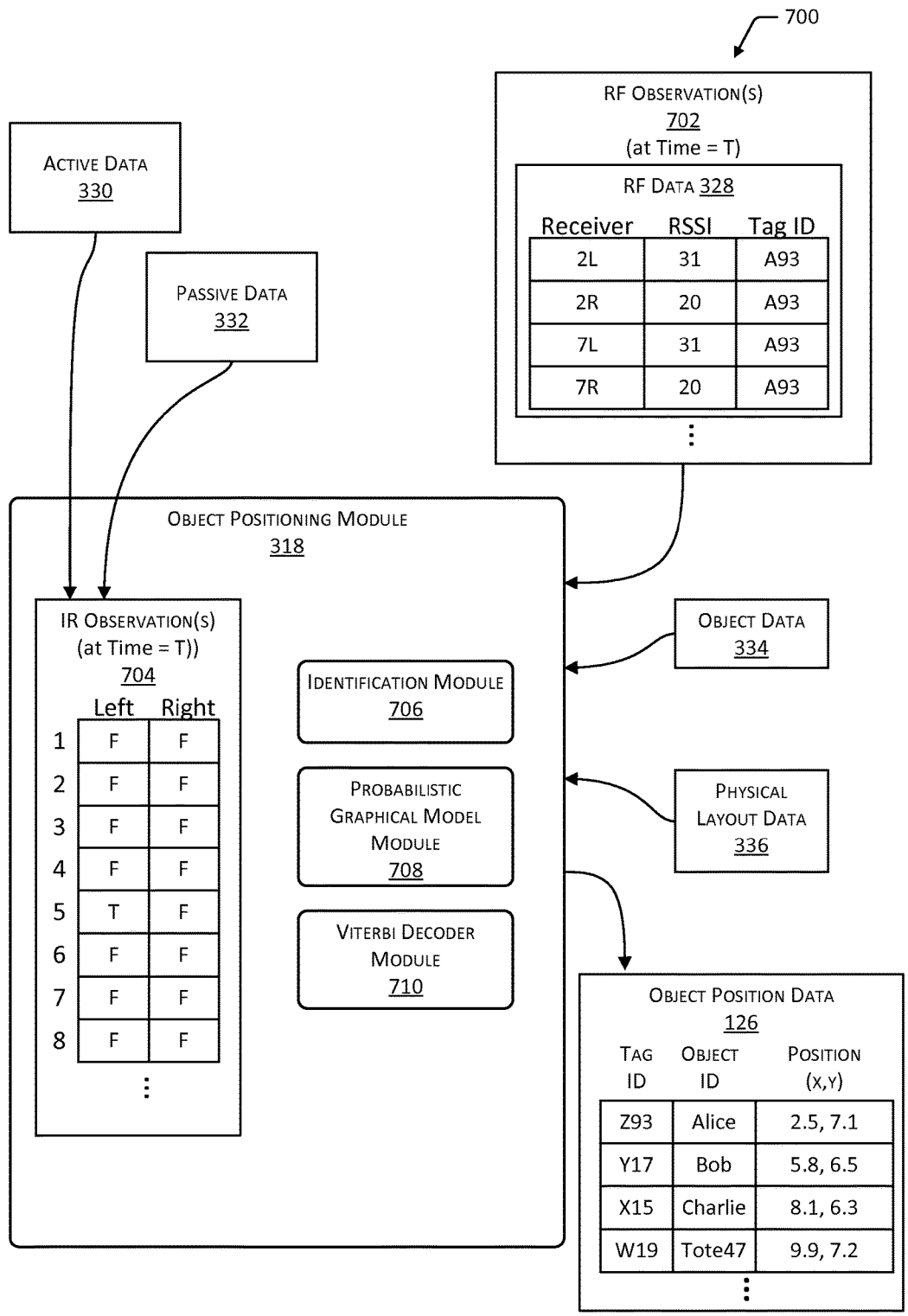
FIG. 7 is a block diagram illustrating a portion of the object positioning system, according to some implementations.

FIG. 7 is a block diagram 700 illustrating a portion of the object positioning system 124, according to some implementations. In this illustration, RF observations 702 are depicted. The RF observations 702 comprise RF data 328 at particular moments in time. For example, the RF data 328 for time "T" depicts that RF receiver 212 "2L" has an RSSI of "31" for the RF signal 208 received from the RF tag 206 having a tag identifier of "A93". The RF receiver 212 may be identified in the RF data 328 by way of a serial number or other unique identifier associated with each RF receiver 212, or by the physical position within the facility 102. In other implementations where the receivers are configured to receive non-RF signals 208, these may be designated as non-optical observations.

IR observations 704 are also depicted. The object positioning module 318 may accept the active data 330 and the passive data 332 and generate the IR observations 704. The IR observations 704 may express output of an optical model, which uses the active data 330 and the passive data 332 to determine a probability that the object 116 is positioned within a given cell 602. For example, as described above, the active data 330 may provide an indication as to the row 504 of the object 116, while the passive data 332 provides an indication as to the column 506 of the object 116. By combining this data, one or more cells 602 may be designated as occupied. As illustrated here, the IR observations 704 may be expressed as a Boolean structure such as true/false or high/low with regard to a particular cell 602 being occupied by the object 116. In other implementations where the sensors are configured to operate in other wavelengths, such as ultraviolet or visible light, the information may be designated as optical observations.

The object positioning module 318 may include one or more additional modules including an identification module 706, a probabilistic graphical model module 708, a Viterbi decoder module 710, and so forth. The identification module 706 is configured to identify the object 116. This identification may be used to distinguish one object 116 from another. In one implementation, the identification module 706 may access the object data 334 and use the tag identifier included in the RF observations 702 to associate the RF tag 206 with a particular object 116. For example, the RF tag identifier "Y17" may be associated with the user account for "Bob" while the RF tag identifier "W19" is associated with a device such as "Tote47". The association between the RF tag identifier and the object 116 may be made at the time the object 116 enters the facility 102. For example, upon entry to the facility 102 a user may be identified by way of one or more biometric characteristics such as facial, iris, or fingerprint recognition. The identification may then be associated with the RF tag 206 in the user's possession.

The probabilistic graphical model module 708 is configured to use a probabilistic graphical model to determine possible values of the RF observations 702 and the IR observations 704 given an unknown position 118. The model may be used to generate scores for the cells 602, with the score being based on or proportional to one or more probabilities associated with of the observations. In some implementations the probabilities may be representative of probability densities. The probabilistic graphical model module 708 may also access at least a portion of the physical layout data 336 to access position information associated with the one or more sensors 120. In some implementations, the data provided by the one or more sensors 120 may include the self-reported position of the sensor 120.

The Viterbi decoder module 710 may process the resulting probabilities to determine the cell 602 having the greatest probability of containing the object 116. Based on this, the cell 602 having the greatest probability of containing the object 116 is reported as the position 118 for the object 116 in the object position data 126. As time progresses, the probabilistic graphical model module 708 receives and processes additional RF observations 702 and IR observations 704. The probabilistic graphical model module 708 may also account for transition or movement of the object 116 from one cell 602 to an adjacent cell 612, and the object position data 126 may be updated accordingly. Operation of the probabilistic graphical model module 708 is described next with regard to FIG. 8.

The data and observations described above are illustrated in tabular format for ease of illustration, and not by way of limitation. In other implementations, other data structures may be used. For example the data may be stored as linked lists, object database nodes, key-value pairs, and so forth.

Figure 8:
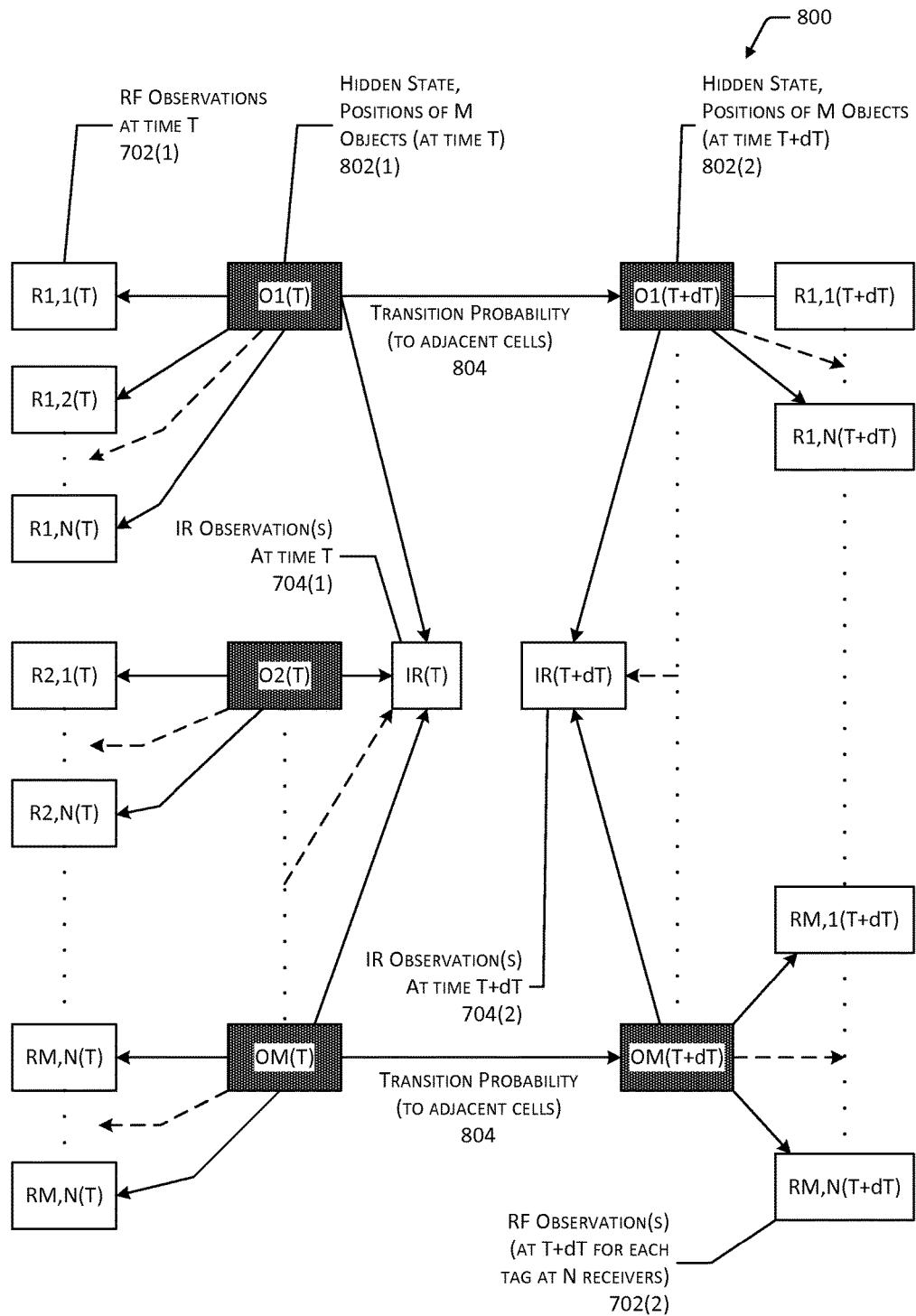
FIG. 8 is an illustration of a probabilistic graphical model for determination of the position based on data from the sensors, according to some implementations.

FIG. 8 illustrates the probabilistic graphical model module (model) 708, according to some implementations. In this illustration shaded boxes indicate unknown values which the model 708 is configured to determine. Unshaded boxes indicate known values, such as the observations based on data from the sensors 120. Should an observation be unavailable, a default value may be used, or the missing value may be omitted from the process.

This illustration depicts the model at two points in time, an initial time "T" and a subsequent time "T+dT". While two points in time are depicted, it is understood that the process implementing this model may continue running as time progresses.

As illustrated here at 802(1), the positions 118 of "M" objects at time T is a hidden state, or unknown. The goal of the model 708 is to determine a true cell 602 occupied by the object 116 at time T and subsequent times T+dT.

An RF model may determine a probability distribution conditioned on a true position of the center-of-mass of the object 118 based on the RSSI value for the RF receivers 212. The RF model is depicted in this figure as the arrow pointing from the positions of the M objects at time T 802(1) (designated as OM(T)) to multiple RF observations 702 (designated as RM(T)). Assuming the radiated power of the RF tag 206 is relatively consistent, the received strength of the RF signal 208 at the RF receivers 212 will be proportionate to the distance between the RF tag 206 and the antenna of the RF receiver 212. For example, the RSSI will be greater when the RF tag 206 is 30 cm from the antenna of the RF receiver 212 compared to when the RF tag 206 is 2 meters from the antenna. The RSSI may vary based on the orientation of the RF tag 206 with respect to the RF receiver 212. In some implementations, the model may account for these different orientations. Based on the RF observations 702. The model may produce a probability distribution of RSSI for the RF receivers 212. The probability distribution may be analyzed to reduce or eliminate the image of outlier measurements.

In this illustration an arrow extending from the object 116 positions 118 OM(T) 802(1) to the IR(T) 704(1) and from OM(T+dT) 802(2) to IR(T+dT) 704(2) represent an IR model for the IR values. The IR model is based on an assumption that when the object 116 is known to be in a given cell 602, adjacent light beams 508 within some distance will be blocked with a high probability. For example, the light beam 508 for the cell 602 containing the center-of-mass of the object 116 will have a probability of being obscured or blocked close to 1. Similarly, there is some non-zero probability for the adjacent cells 612 to be obscured as well. In some implementations, the object data 334 may provide information associated with the size of the object 116. In these implementations, the size may be used to determine the probability in the IR model. For example, where the object 116 comprises a tote 210 having a known length and width of 1 meter and the rows 504 are 15 cm in length along the aisle 112, there is a high probability that the light beams 508 of at least six rows 504 will be obscured by the tote 210.

In this illustration an arrow extending from the object 116 positions 118 OM(T) 802(1) to the object 116 positions 118 OM(T+dT) 802(2) represent a transition probability 804 model. The transition probability 804 model allows the object positioning module 318 to account for the movement of the object 116 within the facility 102. The object 116 may transition from one cell 602 to another cell 602 within the grid with some probability. The transition may include remaining within a cell 602 or moving to an adjacent cell 612. The system may be configured with a dT and a cell 602 size such that the object 116 may only transition to one of the cells 602 immediately adjacent. For example, where the cells 602 are arranged in a grid, the object 116 may remain in the occupied cell 608 or transition to one of the five adjacent cells 612, as depicted in FIG. 6. Based on these constraints, these six cells depicted as the candidate cells 610 in FIG. 6 have a high probability conditioned on a previous location O(T), while the remaining unoccupied cells 606 have a low or zero probability.

The IR model and the corresponding IR dependence provide a Boolean true/false (or high/low) structure. Based on this, the Viterbi decoder module 710 may solve OM(T) as a cell 602 having a maximum likelihood of being occupied by the object 116 at time instant T, given as input the RF observations at time T 702(1) and the IR observations at time T 704(1).

As time progresses to time T+dT additional observations may be acquired. It is unknown whether the object 116 remained stationary or moved, thus OM(T+dT) 802(2) maintains a hidden state. The candidate cells 610 are considered as potential locations for the object 116 at the subsequent time T+dT. The model may be used to compute a score for each of the candidate cells 610, to determine the position OM(T+dT) 802(2).

As illustrated here, the IR observations at time T+dT 704(2) may be used to determine a set of cells 602, which the object 116 may be occupying. For example, the IR observations 704(2) may be used to restrict a space of possible positions for the object 116, by eliminating from consideration the cells 602 which are unoccupied. As described above, an unobscured light beam 508 at the time T+dT implies no object is in that cell 602 or row 504, and may also imply no object 116 is present in the cells 602 adjacent thereto. Based on this, the model may assign a zero or very low score below a threshold for consideration indicating these cells are unoccupied cells 606. The unoccupied cells 606 may thus be removed from a set of candidate cells 610, and may be subsequently ignored for all objects 116. The candidate cell 610 may thus comprise those cells 602, not otherwise excluded by the IR observations 704.

The model having taken the IR observations 704 into account may now apply the RF observations 702. For each of the candidate cells 610, a set of cells 602 adjacent to a particular candidate cell 610 is determined. The particular candidate cell 610 undergoing analysis may be designated as "G" and the cells adjacent thereto may be designated as "H". For example, referring to FIG. 6, the occupied cell 608 located at row 5 in the left column is surrounded by the adjacent cells 612. The adjacent cell 612 located at row 4 in the right column in turn has a set of adjacent cells 612. Thus where G is the cell 602 at row 4, right column, the cells "H" are all of the cells 602 in rows 3, 4, and 5.

The object positioning module 318 may be configured to calculate a score for each G according to the following equation:

$$\text{Score}(G) = \sum_H \{\text{Score}(H \text{ at previous time}) \times \text{Transition Score } (H \rightarrow G) \times \text{Score } (RSSI \mid G)\} \quad \text{Equation 1}$$

At any time instant, the object positioning module 318 outputs the cell 602 with a highest score of G (as computed above) as the most likely position 118 of the object 116.

By using the techniques described above, the object positioning module 318 is able to determine the position 118 of one or more objects 116 within the facility 102. The objects 116 may be in motion relative to the facility 102, relative to one another, or both.

The object positioning module 318 may generate a map of the position 118 of each object 116. The maps of different objects 116 may be analyzed to determine when objects 116 come together or separate, and to disambiguate between the objects 116 as they move adjacent to one another. For example, a first map is generated of a first user walking through the facility 102, while a second map is generated of a second user walking through the facility 102.

The object positioning module 318 is configured to provide object position data 126 for a plurality of objects 116 such as the users which may move past one another within the aisle 112. For example, as the two users approach and finally pass one another, their positions as indicated by their respective maps over time, draw closer, overlap, or coalesce, and then separate. At the point of closest approach, a zone of confusion may exist within which the object positioning module 318 is unable to distinguish one user from another user, and the position thereof. The transition probability 804 model may be used to estimate the position 118 and relative motion over time of the object 116 within the zone of confusion.

The object positioning module 318 may then disambiguate between the two users as they separate based at least in part on the RF observations 702. For example, the RSSI at an RF receiver 212(1) at one end of the aisle 112 will increase as the RF tag 206(1) worn by the first user approaches the RF receiver 212(1). Similarly, the RSSI at another RF receiver 212(2) located at an opposite end of the aisle 112 will increase as the RF tag 206(2) worn by the second user approaches the RF receiver 212(1). Based on the RF observations 702, the users may be disambiguated from one another.

In another example, the object positioning module 318 may be configured to provide object position data 126 for a plurality of objects 116 moving down an aisle 112 in a group. For example two users may walk side by side down the aisle 112. While the IR observations 704 may place the users within particular rows 504, the column 506 in which a particular user is positioned may be disambiguated based on the RSSI data acquired from their respective RF tags 206. For example, at the RF receiver 212 located on the left side of the aisle 112, the RSSI will be greater for the RF signal 208(1) from the RF tag 206(1) of the user in the left column 506 then the signal 208(2) from the RF tag 206(2) of the user in the right column 506.

Illustrative Processes

Figure 9:
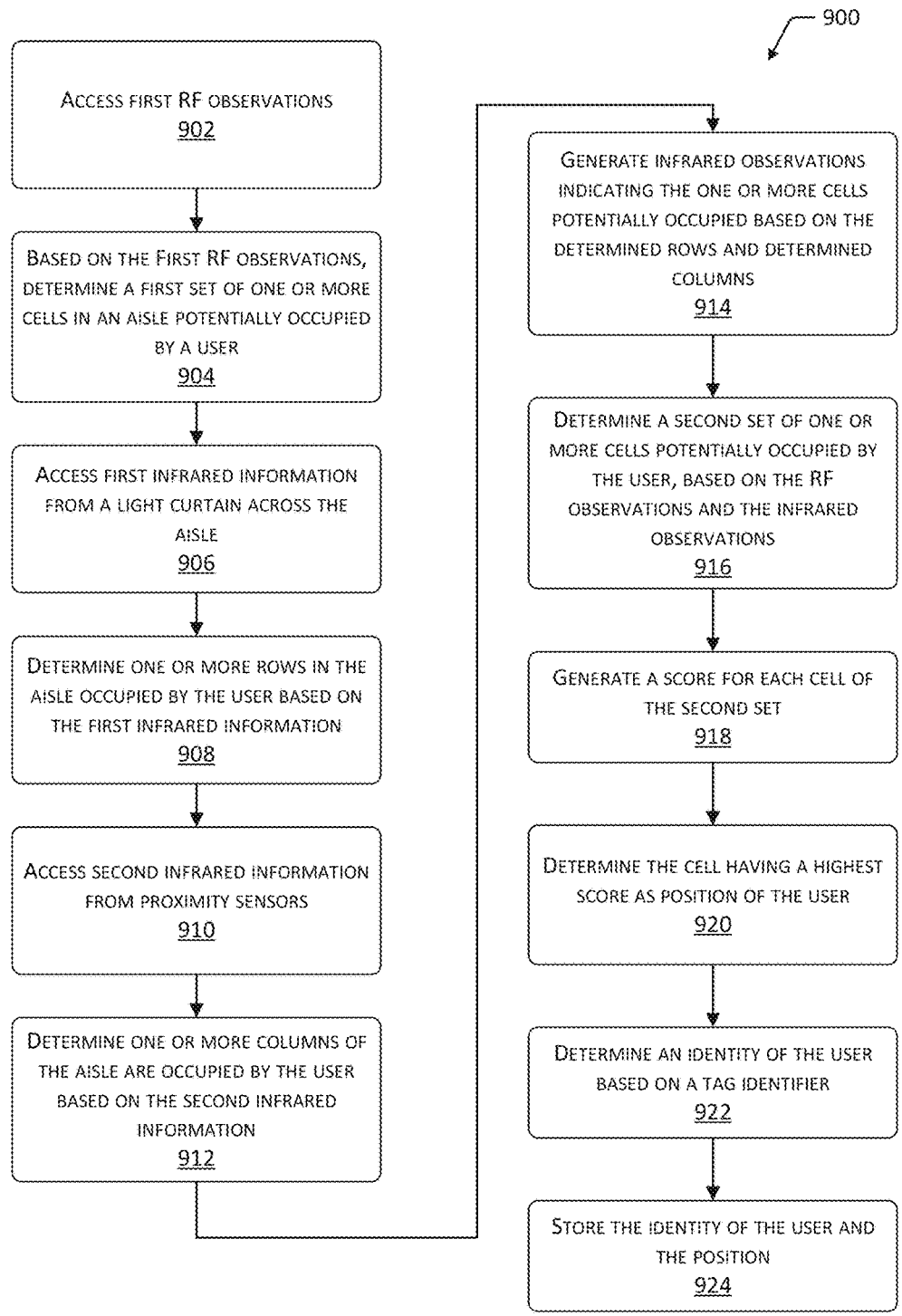
FIG. 9 depicts a flow diagram of a first process for determining a position of an object, according to some implementations.

FIG. 9 depicts a flow diagram 900 of a first process for determining a position 118 of an object 116 such as a user, according to some implementations. The process may be performed at least in part by the object positioning system 124.

Block 902 accesses the first RF observations, such as RF observations 702. As described above the RF observations 702 may comprise data indicative of a tag identifier received from the RF tag 206 and received signal strength information (RSSI) associated with reception of the RF signal 208 at the RF receivers 212. The RF data 328 from which the RF observations 702 are produced may be received from one or more of the RF receivers 212.

Based on the first RF observations, block 904 determines a first set of one or more cells in an aisle potentially occupied by the user. For example, based on known factors of the RF tag 206 and the RF receivers 212, a distance between the RF receiver 212 and the RF tag 206 may be estimated. Using a known location of the RF receiver 212 as stored in the physical layout data 336, the cells 602 within an area described by the distance may be determined.

Block 906 accesses first infrared information from a light curtain across an aisle, such as the active data 330. As described above, the active data 330 may be obtained from the active IR transmitter/receiver pairs 214. The active data 330 indicates whether the light beam 508 for the row 504 is unobstructed or obstructed with respect to the corresponding receiver.

Block 908 determines the one or more rows in the aisle occupied by the user based on the first infrared information. For example, when the pair 214 for row 5 indicates the light beam 508 is not received at the RF receiver, the user may be determined to be in row 5.

Block 910 accesses second infrared information from proximity sensors, such as passive data 332. As described above, the passive data 332 may be obtained from the passive IR sensors 216 indicating proximity of the user. As described above, the passive IR sensors 216 may be arranged on both sides of the aisle 112.

Block 912 determines one or more columns of the aisle occupied by the user based on the second infrared information. For example, passive data 332 may indicate the proximity of the user to the passive IR sensor 216 located on the left side of the aisle 112. Based on this proximity, the user may be determined as being in the left column 506.

Block 914 generates IR observations indicating the one or more cells potentially occupied based on the determined rows and determined columns. For example, the IR observations 704 may comprise a Boolean data structure in which each cell 602 is assigned a value of true or false indicative of a presence of the user.

Block 916 determines a second set of one or more cells potentially occupied by the user based on the RF observations and the infrared observations, wherein the second set is a subset of the first set.

Block 918 generates a score for each cell of the second set, wherein the score expresses a probability the cell is occupied by the user. In some implementations, the score may be calculated using the method described above with regard to Equation 1. For example, the score for a given cell 602 in the second set may comprise a sum of values for all adjacent cells 612 to the given cell 602 and including the given cell 602, the value comprising a product of: an adjacency score indicative of probability of presence of the user in the adjacent cell 612 at a previous time, a transition score indicative of a probability the user moved from the adjacent cell 612 to the given cell 602, and a probability of the RSSI having a certain value when the given cell 602 is the position of the RF tag.

Block 920 determines the cell having a highest score as position of the user. In some implementations the position may be expressed in terms of the cell 602, such as aisle, row, and column, or as other coordinates or representations of physical location.

Block 922 determines an identity of the user based on a tag identifier. For example, the RF tag identifier received in the RF signal 208 may be used to search the object data 334 to determine a corresponding user account, username, and so forth.

Block 924 stores the identity of the user and the position. For example, the object positioning module 318 may generate the object position data 126.

Figure 10:
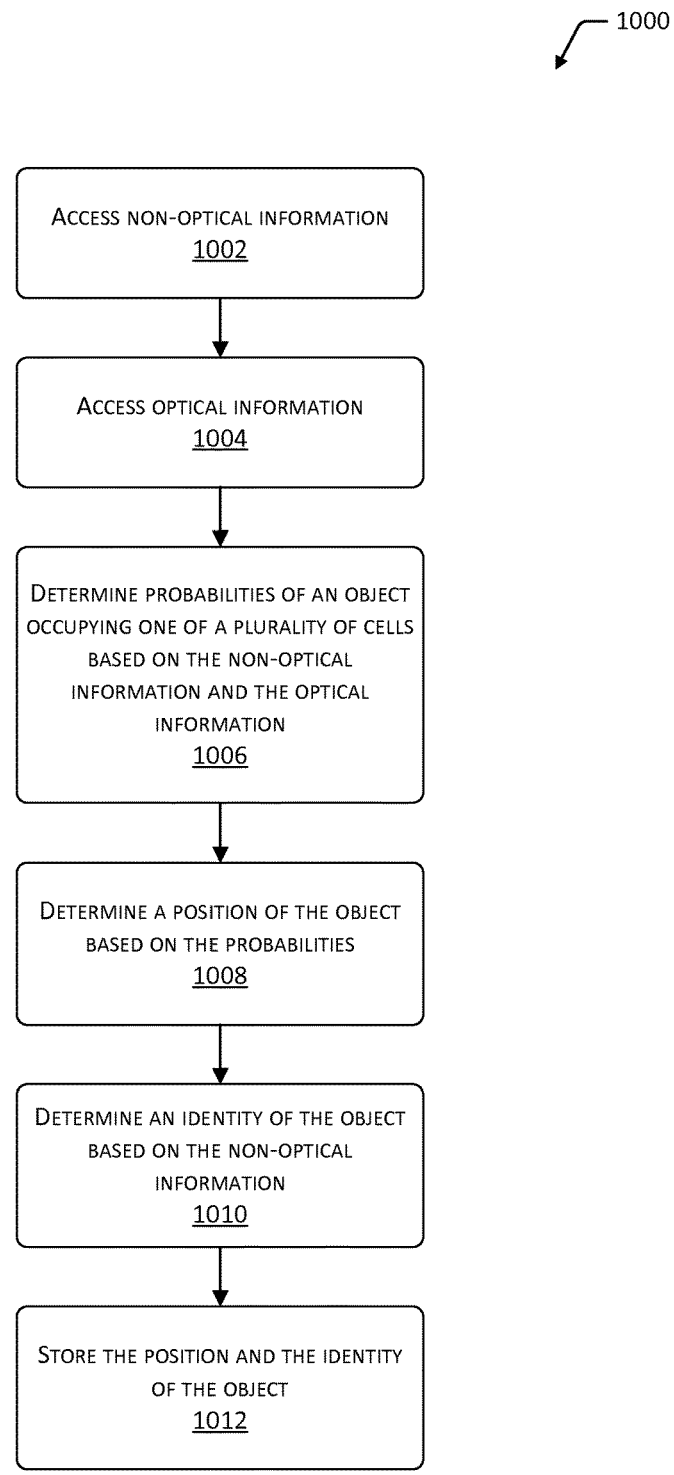
FIG. 10 depicts a flow diagram of a second process for determining a position of an object, according to some implementations.

FIG. 10 depicts a flow diagram 1000 of a second process for determining a position of an object 116, according to some implementations. The process may be performed at least in part by the object positioning system 124.

Block 1002 accesses non-optical information from one or more non-optical sensors. The non-optical sensors are configured to receive a non-optical signal from a tag associated with the object 116 and generate non-optical information. In one implementation, the non-optical sensors may include the RF receivers 212 configured to accept an RF signal 208 generated by an RFID tag 206. In other implementations, the non-optical sensors may include microphones or other acoustic signal receivers, and so forth configured to accept an acoustic signal generated by an acoustic tag.

Block 1004 accesses optical information from the one or more optical sensors. The optical sensors are configured to optically detect a presence of the object 116 and generate optical information. In one implementation, the optical sensors may include the active IR transmitter/receiver pairs 214, the passive IR sensors 216, or both. In other implementations, the optical sensors may include microbolometers, imaging cameras, range cameras, laser scanners, and so forth. As described above, the microbolometer may be configured to detect infrared radiation associated with the object 116, or detect occlusion by the object 116 of infrared radiation in the background.

Block 1006 determines probabilities of an object occupying one or more of a plurality of cells based on the non-optical information and the optical information. The probability determination may employ a model wherein the position 118 occupied by the object 116 is a hidden state and the optical information and the non-optical information comprise the observations used to determine the probability that the object 116 occupies one or more of the plurality of positions 118. In some implementations, the model may produce a plurality of cells 602 having corresponding probabilities that the cells 602 are occupied. A Viterbi decoder may be used to solve for the one of the plurality of positions 118 having a maximum probability of containing the object 116.

The determination of the probability may include calculating a transition probability indicative of a probability the object moves from a first position to a second position, wherein the second position is part of a set of positions adjacent to the first position. The determination of the probability may also include a previously calculated probability of the object 116 occupying the second position.

In some implementations the determination of the probability may include calculating a probability of detecting a particular received signal strength by a particular non-optical sensor given the tag at a particular position. For example, the probability may be expressed as an RSSI value given a particular RF receiver 212 and the RF tag 206 at a given position.

In some implementations, one or more of the size or shape of the object 116 may be determined. Manual entry, analysis of one or more two-dimensional images acquired by cameras, point cloud data acquired by a range camera or other three-dimensional input device, and so forth may provide information indicative of size and shape data of the object 116 upon entry to the facility 102. The probability that the object 116 occupies one or more of the plurality of positions 118 may be based at least in part on one or more of the size or shape of the object 116. For example, as described above, the size of the object 116 may be used to determine how many light beams 508 in the light curtain may be obstructed by the object 116.

Block 1008 determines a position of the object based on the probabilities. For example, the cell having a highest probability of being occupied by the object 116 may be designated as the occupied cell 608.

Block 1010 determines an identity of the object based on the non-optical information. For example, the RF identifier received from the RF tag 206 may be associated with a particular user or tote 210. In some implementations, the identity of the object 116 may be determined based on information other than that acquired from the RF tag 206. In one example, voice recognition may be used to identify a user.

In other implementations, the identity of the object 116 may be determined at least in part by mechanisms using optical information. For example optical object recognition may be used to identify an object 116 based on an image acquired by an imaging device such as a camera. In another example, a machine readable code may be read and used to provide identity information.

Block 1012 stores the position and the identity of the object as object position data 126. In some implementations time of the position may also be stored. As described above, the object position data 126 may be accessed by other systems, such as the inventory management system 122, time and attendance systems, and so forth.

Figure 11:
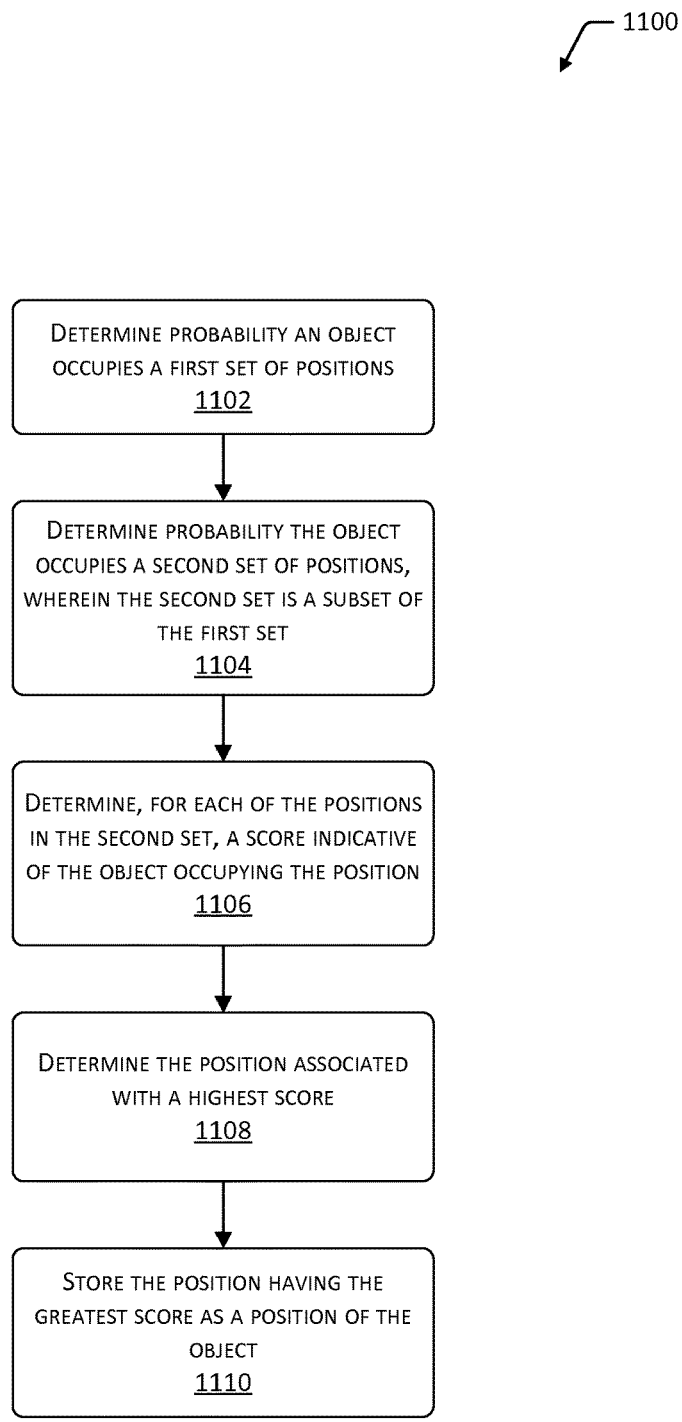
FIG. 11 depicts a flow diagram of a third process for determining a position of an object, according to some implementations.

FIG. 11 depicts a flow diagram 1100 of a third process for determining position of an object, according to some implementations. The process may be performed at least in part by the object positioning system 124.

Block 1102 determines a probability the object occupies a first set of positions. The probability may be based at least in part on RF data 328 gathered by a plurality of radio frequency (RF) receivers 212 receiving a RF signal 208 from an RF tag 206 associated with the object 116. In some implementations positions 118 of a plurality of objects 116 may be disambiguated based at least in part on the RF data 328 from the plurality of RF receivers 212.

Block 1104 determines a probability the object occupies a second set of positions, wherein the second set is a subset of the first set. The probability may be based at least in part on active data 330, passive data 332, or both, as gathered by a plurality of optical sensors. In some implementations the second set of positions 118 is a subset of the first set of positions 118.

Block 1106 determines, for each of the positions in the second set, a score indicative of the object occupying the position. The score may be based on data gathered from sensors associated with the object 116. For example, the object 116 may incorporate one or more motion sensors comprising one or more of an accelerometer, a gyroscope, or a magnetic field sensor. Motion sensor data from one or more motion sensors associated with the object 116 may be received and processed to determine movement data indicative of movement of the object 116. The movement data may be used to generate a probability of the object 116 transitioning from one position 118 to another, such as from one cell 602 to an adjacent cell 612. The determination of the score indicative of the object occupying the position may then be based at least in part on the motion sensor data.

In one implementation, the score may be calculated as described above with regard to Equation 1. This may include summing values for all positions 118 adjacent to and including the given position 118, the value comprising a product of: an adjacency score indicative of probability of presence of the object 116 in the adjacent position 118 at a previous time, a transition score indicative of a probability of object 116 movement from the adjacent position 118 to the given position 118, and a probability of a particular signal strength of the signal received from the tag when the given position 118 is the position of the RF tag.

Block 1108 determines the position associated with a highest score. For example, the scores may be sorted and the highest ranking score, selected.

Block 1110 stores the position having a greatest score as a position of the object 116. As described above, and some implementations, the identity of the object 116 may also be determined.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. An object positioning system at a facility, comprising:
   one or more non-optical sensors configured to receive a non-optical signal from a tag associated with an object and generate first information;
   one or more optical sensors configured to optically detect likely presence of the object and generate second information;
   a computing system in communication with the one or more non-optical sensors and the one or more optical sensors, the computing system including:
      one or more hardware processors; and
      a memory coupled to the one or more hardware processors and storing program instructions that when executed by the one or more hardware processors cause the one or more hardware processors to:
         access the first information from the one or more non-optical sensors;
         access the second information from the one or more optical sensors; and
         process the first information and the second information to determine probabilities of the object occupying one or more of a plurality of positions.

2. The object positioning system of claim 1, wherein the determination of the probabilities uses a hidden Markov model and the first information and the second information comprise observations used to determine a probability that the object occupies the one or more of the plurality of positions.

3. The object positioning system of claim 1, wherein the determination of the probabilities includes calculating a transition probability indicative of a probability the object moves from a first position to a second position, wherein the second position is part of a set of positions adjacent to the first position.

4. The object positioning system of claim 1, wherein the determination of the probabilities further includes a previously calculated probability of the object occupying a second position.

5. The object positioning system of claim 1, wherein the determination of the probabilities includes calculating a probability of detecting a particular received signal strength by a particular non-optical sensor given the tag at a particular position.

6. The object positioning system of claim 1, wherein the determination of the probabilities uses a Viterbi decoder to solve for one of the one or more of the plurality of positions having a maximum probability of containing the object.

7. The object positioning system of claim 1, the program instructions that when executed by the one or more hardware processors further cause the one or more hardware processors to:
   determine a size and shape of the object; and
   wherein a probability that the object occupies the one or more of the plurality of positions is based at least in part on the size and shape of the object.

8. The object positioning system of claim 1, wherein the one or more optical sensors comprise:
   a plurality of infrared transmitters configured to generate a horizontal light curtain at a height above a floor by sending light beams to corresponding infrared receivers, and
   a plurality of passive IR sensors configured to determine proximity of the object by way of infrared radiation associated with the object.

9. The object positioning system of claim 1, wherein the one or more optical sensors comprise a microbolometer array configured to detect infrared radiation associated with the object.

10. The object positioning system of claim 1, wherein:
    the tag comprises a radio frequency (RF) transmitter;
    the one or more non-optical sensors comprise a plurality of RF receivers configured to receive an RF signal from the RF transmitter; and
    the first information comprises signal strength data indicative of the RF signal received by the plurality of RF receivers.

11. The object positioning system of claim 1, wherein:
    the tag comprises an acoustic transmitter;
    the one or more non-optical sensors comprise a plurality of acoustic receivers configured to receive an audio signal from the acoustic transmitter; and
    the first information comprises signal strength data indicative of the audio signal received by an acoustic receiver.

12. A computer-implemented method for determining a position of an object at a facility executed by one or more computing systems, the computer-implemented method comprising:
    determining, based on data from a plurality of non-optical sensors, a probability that the object occupies a first set of positions;
    determining, based on data from a plurality of optical sensors, a probability that the object occupies a second set of positions, wherein the second set of positions is a subset of positions within the first set of positions; and
    determining, for each of the positions in the second set of positions, a probability value indicative of the object occupying the each of the positions.

13. The computer-implemented method of claim 12, wherein a probability value for a given cell in the second set of positions is calculated based on the following equation, wherein the given cell is designated by "G", and cells adjacent to the given cell are designated as "H":

$$\text{Score}(G) = \sum_H \{\text{Score}(H \text{ at previous time}) \times \text{Transition Score } (H \to G) \times \text{Score } (RSSI \mid G)\}.$$

14. The computer-implemented method of claim 12, further comprising:
determining a position of the second set of positions having a highest probability value by solving with a Viterbi decoder for one of a plurality of positions having a maximum probability of containing the object.

15. The computer-implemented method of claim 12, further comprising:
disambiguating positions of a plurality of objects relative to one another based at least in part on the data from the plurality of-non-optical sensors.

16. The computer-implemented method of claim 12, wherein a probability value for a given cell in the second set of positions is a sum of respective values for the given cell and all cells adjacent to the given cell, each respective value comprising a product of: an adjacency probability value indicative of probability of presence of the object in a cell adjacent to the given cell at a previous time, a transition probability value indicative of a probability the object moved into the given cell from the cell adjacent to the given cell, and a probability of RSSI having a certain value when the given cell is a position of an RF tag.

17. The computer-implemented method of claim 12, further comprising:
receiving motion sensor data from one or more motion sensors associated with the object, wherein the one or more motion sensors comprise one or more of an accelerometer, a gyroscope, or a magnetic field sensor; and
wherein the determining the probability that the object occupies the first set of positions is based at least in part on the motion sensor data.

18. An object positioning system at a facility, the system comprising:
a plurality of sensors within the facility, the plurality of sensors including a plurality of non-optical sensors and a plurality of optical sensors;
a computing system in communication with the plurality of sensors, the computing system including:
one or more hardware processors; and
a memory coupled to the one or more hardware processors and storing program instructions that when executed by the one or more hardware processors cause the one or more hardware processors to:
receive, from at least one of the plurality of non-optical sensors, first information;
determine a first set of positions potentially occupied by an object, based on the first information;
receive, from at least one of the plurality of optical sensors, second information;
determine a second set of positions potentially occupied by the object by narrowing the first set of positions based on the second information, wherein the second set of positions is a subset of the first set of positions;
generate, for each position of the second set of positions, a probability value indicative of a probability the position is occupied by the object; and
determine an identity of the object based at least in part on an RF tag identifier.

19. The object positioning system of claim 18, wherein
the plurality of sensors are arranged along both sides of an aisle within the facility;
an area within the aisle is designated by way of a grid of cells comprising rows extending across the aisle and left and right columns having a left cell relative to a centerline of the aisle;
the determining the first set of positions comprises determining a first set of cells potentially occupied by the object; and
the determining the second set of positions comprises determining a row and column potentially occupied by the object.

20. The object positioning system of claim 18, the plurality of sensors comprising:
a plurality of radio frequency (RF) receivers configured to receive an RF signal from an RF tag associated with the object;
a plurality of pairs of optical transmitters and corresponding optical receivers, wherein:
a transmitter of each pair is arranged on a first side of an aisle and a receiver of each pair is arranged on a second side of the aisle,
the pairs are configured to generate a light curtain by sending respective light beams from a respective transmitter to a respective receiver, and
the arrangement of the plurality of pairs of optical transmitters and the corresponding optical receivers designate boundaries between two or more rows in the aisle; and
a plurality of passive infrared (IR) sensors configured to determine proximity of the object by way of infrared radiation associated with the object, wherein the plurality of passive IR sensors are arranged on both sides of the aisle.

21. The object positioning system of claim 20, wherein:
the plurality of RF receivers are arranged at intervals along the aisle, the intervals being between 60 and 200 centimeters;
the plurality of pairs of optical transmitters and the corresponding optical receivers are arranged at a height of between 60 and 100 centimeters above a floor of the aisle; and
the plurality of pairs of optical transmitters and the corresponding optical receivers are arranged at intervals along the aisle, the intervals being between 8 and 30 centimeters.

* * * * *

UNITED STATES PATENT AND TRADEMARK OFFICE
CERTIFICATE OF CORRECTION

PATENT NO. : 10,422,852 B1  
APPLICATION NO. : 14/133409  
DATED : September 24, 2019  
INVENTOR(S) : Thiagarajan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 870 days.

Signed and Sealed this  
Fourteenth Day of July, 2020

Andrei Iancu  
*Director of the United States Patent and Trademark Office*